(12) United States Patent
Misaizu et al.

(10) Patent No.: US 11,692,806 B2
(45) Date of Patent: *Jul. 4, 2023

(54) STRAIN GAUGE WITH IMPROVED STABILITY

(71) Applicant: MINEBEA MITSUMI Inc., Nagano (JP)

(72) Inventors: Eiji Misaizu, Kanagawa (JP); Akiyo Yuguchi, Shizuoka (JP); Shigeyuki Adachi, Shizuoka (JP); Toshiaki Asakawa, Shizuoka (JP); Atsushi Kitamura, Shizuoka (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/650,553

(22) PCT Filed: Sep. 26, 2018

(86) PCT No.: PCT/JP2018/035727
§ 371 (c)(1),
(2) Date: Mar. 25, 2020

(87) PCT Pub. No.: WO2019/065752
PCT Pub. Date: Apr. 4, 2019

(65) Prior Publication Data
US 2020/0292294 A1 Sep. 17, 2020

(30) Foreign Application Priority Data

Sep. 29, 2017 (JP) .............. JP2017-191824
Mar. 20, 2018 (JP) .............. JP2018-052422

(51) Int. Cl.
*G01L 1/22* (2006.01)
*G01B 7/16* (2006.01)
*C22C 38/42* (2006.01)

(52) U.S. Cl.
CPC ............. *G01B 7/18* (2013.01); *C22C 38/42* (2013.01); *G01L 1/2287* (2013.01)

(58) Field of Classification Search
None
See application file for complete search history.

(56) References Cited

U.S. PATENT DOCUMENTS 3,867,231 A   2/1975   Casey
4,658,233 A   4/1987   Uchida et al.
(Continued)

FOREIGN PATENT DOCUMENTS

CN   1467757   1/2004
CN   1701219   11/2005
(Continued)

OTHER PUBLICATIONS

Mars J R: "New Strain Gages Are Similar to Thin Film Resistors, Permit Analysis of Multilayer Boards", Insulation, Circuits, Lake Publishing Co., Libertyville, IL, US, vol. 19, No. 11, Oct. 1, 1973 (Oct. 1, 1973), pp. 35-37, XP009047141, ISSN: 0020-4544 *the whole document*.

(Continued)

*Primary Examiner* — Lisa M Caputo
*Assistant Examiner* — Nigel H Plumb
(74) *Attorney, Agent, or Firm* — IPUSA, PLLC

(57) ABSTRACT

A strain gauge includes a flexible resin substrate; a functional layer formed of a metal, an alloy, or a metal compound, directly on one surface of the substrate; a resistor formed of a film including Cr, CrN, and $Cr_2N$, on one surface of the functional layer; and an insulating resin layer with which the resistor is coated.

13 Claims, 14 Drawing Sheets

(56) References Cited

U.S. PATENT DOCUMENTS

| | | | |
|---|---|---|---|
| 4,737,757 A | 4/1988 | Senda et al. | |
| 4,758,816 A | 7/1988 | Blessing et al. | |
| 4,786,887 A | 11/1988 | Bringmann et al. | |
| 4,876,893 A * | 10/1989 | Kato | G01L 1/2287 338/42 |
| 4,894,635 A | 1/1990 | Yajima et al. | |
| 4,937,550 A * | 6/1990 | Tawada | G01L 1/2293 338/5 |
| 5,154,247 A * | 10/1992 | Nishimura | G01L 1/2287 177/229 |
| 5,328,551 A | 7/1994 | Kovacich | |
| 5,349,746 A | 9/1994 | Gruenwald et al. | |
| 5,455,453 A | 10/1995 | Harada et al. | |
| 5,622,901 A | 4/1997 | Fukada | |
| 5,914,168 A * | 6/1999 | Wakamatsu | G11B 5/7264 428/141 |
| 6,512,510 B1 | 1/2003 | Maeda | |
| 7,347,464 B2 | 3/2008 | Tanabe | |
| 7,649,278 B2 | 1/2010 | Yoshida et al. | |
| 8,232,026 B2 | 7/2012 | Kumar et al. | |
| 9,256,119 B2 | 2/2016 | Nam et al. | |
| 9,306,207 B2 | 4/2016 | Woo et al. | |
| 9,827,951 B2 | 11/2017 | Toda | |
| 11,087,905 B2 | 8/2021 | Asakawa et al. | |
| 2003/0016116 A1 | 1/2003 | Blaha | |
| 2004/0056321 A1 | 3/2004 | Parsons | |
| 2004/0140868 A1 | 7/2004 | Takeuchi et al. | |
| 2005/0160837 A1 | 7/2005 | Tellenbach et al. | |
| 2005/0188769 A1 * | 9/2005 | Moelkner | G01L 9/08 73/715 |
| 2005/0276990 A1 * | 12/2005 | Kohara | C23C 28/341 427/532 |
| 2006/0162434 A1 | 7/2006 | Saito et al. | |
| 2008/0253085 A1 | 10/2008 | Soffer | |
| 2009/0178877 A1 | 7/2009 | Keller et al. | |
| 2011/0109701 A1 | 5/2011 | Ohashi | |
| 2012/0190166 A1 | 7/2012 | Okuda | |
| 2013/0082970 A1 | 4/2013 | Frey et al. | |
| 2013/0181808 A1 | 7/2013 | Chen et al. | |
| 2013/0300254 A1 | 11/2013 | Fujii et al. | |
| 2015/0188769 A1 | 7/2015 | Gu | |
| 2015/0276517 A1 | 10/2015 | Ashida et al. | |
| 2015/0296607 A1 | 10/2015 | Yang et al. | |
| 2015/0348900 A1 | 12/2015 | Nishimura et al. | |
| 2016/0114584 A1 | 4/2016 | Abbot, Jr. et al. | |
| 2016/0282205 A1 | 9/2016 | Huo et al. | |
| 2016/0334289 A1 | 11/2016 | Kieffer et al. | |
| 2016/0372606 A1 | 12/2016 | Ito et al. | |
| 2017/0123548 A1 | 5/2017 | Shih et al. | |
| 2017/0199096 A1 | 7/2017 | Miyajima | |
| 2017/0261388 A1 | 9/2017 | Ma et al. | |
| 2017/0294387 A1 | 10/2017 | Kawabata et al. | |
| 2017/0336900 A1 | 11/2017 | Lee et al. | |
| 2017/0363486 A1 | 12/2017 | Okulov | |
| 2017/0370796 A1 | 12/2017 | Dusing et al. | |
| 2018/0080842 A1 | 3/2018 | Otsu et al. | |
| 2018/0217016 A1 | 8/2018 | Inamori et al. | |
| 2018/0275001 A1 | 9/2018 | Tokuda | |
| 2020/0076016 A1 | 3/2020 | Riemer et al. | |
| 2020/0271533 A1 * | 8/2020 | Yuguchi | G01B 7/18 |
| 2020/0292294 A1 | 9/2020 | Misaizu et al. | |
| 2020/0333199 A1 | 10/2020 | Asakawa et al. | |
| 2021/0003378 A1 | 1/2021 | Asakawa et al. | |
| 2021/0018382 A1 | 1/2021 | Misaizu et al. | |
| 2021/0033476 A1 | 2/2021 | Toda et al. | |
| 2021/0063259 A1 | 3/2021 | Misaizu et al. | |
| 2021/0247210 A1 | 8/2021 | Asakawa et al. | |
| 2021/0270683 A1 | 9/2021 | Kitamura et al. | |

FOREIGN PATENT DOCUMENTS

| | | |
|---|---|---|
| CN | 105755438 | 7/2016 |
| CN | 106461484 | 2/2017 |
| CN | 106768524 | 5/2017 |
| CN | 111417830 | 7/2020 |
| EP | 0171467 | 2/1986 |
| EP | 725392 | 8/1996 |
| EP | 1197737 | 4/2002 |
| EP | 1530708 | 5/2005 |
| EP | 1557653 | 7/2005 |
| EP | 3690385 | 8/2020 |
| JP | S49-042780 | 4/1974 |
| JP | S58-097607 | 6/1983 |
| JP | S58-169150 | 10/1983 |
| JP | 359-164214 | 9/1984 |
| JP | S60-058578 U | 4/1985 |
| JP | S60-104554 U | 7/1985 |
| JP | S61-176803 | 8/1986 |
| JP | S63-245962 | 10/1988 |
| JP | 563-293432 | 11/1988 |
| JP | H01-202601 | 8/1989 |
| JP | H02-117476 | 5/1990 |
| JP | H02-189981 | 7/1990 |
| JP | H03-191802 | 8/1991 |
| JP | H04-038402 | 2/1992 |
| JP | H04-095738 | 3/1992 |
| JP | H05-080070 | 3/1993 |
| JP | H05-145142 | 6/1993 |
| JP | H06-040305 | 2/1994 |
| JP | H06-176903 | 6/1994 |
| JP | H06-300649 | 10/1994 |
| JP | H07-71906 | 3/1995 |
| JP | H07-113697 | 5/1995 |
| JP | H07-306002 | 11/1995 |
| JP | H08-102163 | 4/1996 |
| JP | H08-304200 | 11/1996 |
| JP | H09-016941 | 1/1997 |
| JP | H09-197435 | 7/1997 |
| JP | H10-270201 | 10/1998 |
| JP | 2000-146511 | 5/2000 |
| JP | 2002-221453 | 8/2002 |
| JP | 2003-035506 | 2/2003 |
| JP | 2003-097906 | 4/2003 |
| JP | 2003-324258 | 11/2003 |
| JP | 2004-072715 | 3/2004 |
| JP | 2006-118982 | 5/2006 |
| JP | 2006-170707 | 6/2006 |
| JP | 2007-076491 | 3/2007 |
| JP | 2007-163405 | 6/2007 |
| JP | 2007-173544 | 7/2007 |
| JP | 2010-070850 | 4/2010 |
| JP | 2010-071006 | 4/2010 |
| JP | 2011-240794 | 12/2011 |
| JP | 2012-151338 | 8/2012 |
| JP | 2013-117422 | 6/2013 |
| JP | 2013-217763 | 10/2013 |
| JP | 2014-074661 | 4/2014 |
| JP | 2015-031633 | 2/2015 |
| JP | 2016-017882 | 2/2016 |
| JP | 2016-074934 | 5/2016 |
| JP | 2016-136605 | 7/2016 |
| JP | 2016-159666 | 9/2016 |
| JP | 2016-225598 | 12/2016 |
| JP | 2017-067764 | 4/2017 |
| JP | 2017-101983 | 6/2017 |
| JP | 2017-129417 | 7/2017 |
| JP | 2017-191821 | 10/2017 |
| JP | 2017-191822 | 10/2017 |
| JP | 2017-210572 | 11/2017 |
| JP | 2017-210573 | 11/2017 |
| JP | 2018-058549 | 4/2018 |
| JP | 2018-132531 | 8/2018 |
| JP | 2019-066312 | 4/2019 |
| JP | 2019-066313 | 4/2019 |
| JP | 2019-066454 | 4/2019 |
| WO | 2004/074800 | 9/2004 |
| WO | 2017/094368 | 6/2017 |

OTHER PUBLICATIONS

Office Action dated May 28, 2021 with respect to the corresponding Chinese Patent Application No. 201880076801.2.

(56) References Cited

OTHER PUBLICATIONS

Extended European Search Report dated Jun. 4, 2021 with respect to the corresponding European Patent Application No. 18860610.7.
International Search Report for PCT/JP2018/035727 dated Dec. 18, 2018.
Yujiro Sakurauchi, "Handbook for utilizing industrial materials", Jan. 25, 1989, pp. 114-149, 166-169, 174-175, 226-235.
Office Action dated Oct. 11, 2022 with respect to the related Japanese patent application No. 2017-246871.
Office Action dated Oct. 18, 2022 with respect to the related Japanese patent application No. 2018-052421.
Office Action dated Oct. 18, 2022 with respect to the related Japanese patent application No. 2018-052422.
Office Action dated Nov. 8, 2022 with respect to the related Japanese patent application No. 2018-073438.
Japan Metal Society,"Metal Data Book", 4th Edition, 4th Printing, pp. 132, Jul. 10, 2008 (With Partial Translation).
Office Action dated Sep. 6, 2022 with respect to the related Japanese patent application No. 2017-191821.
Office Action dated Sep. 6, 2022 with respect to the related Japanese patent application No. 2017-210571.
Office Action dated Sep. 6, 2022 with respect to the related Japanese patent application No. 2020-098850.
C. Rebholz et al., "Structure, mechanical and tribological properties of nitrogen-containing chromium coatings prepared by reactive magnetron sputtering", Surface and Coatings Technology, vol. 115, Issues 2-3, pp. 222-229, Jul. 18, 1999.
Haruhiro Kobayashi, Nikkan Kogyo Shimbun, Ltd., "Sputter thin film—Fundamentals and Applications", 1st Edition, 1st Printing,p. 102-107,Feb. 25, 1993 (With Partial Translation).
Shigeru Ikeda et al., Osaka National Research Institute, AIST, "Improvement of Oxidation Resistivity of Carbon Material by Borosilicate Glass Impregnation", TANSO, 1994, No. 162, p. 84-91, Jun. 28, 2010.
Kyoritsu Shuppan Co., Ltd., "Dictionary of Crystal Growth", 1st Edition, 1st Printing, p. 50-51, Jul. 25, 2001 (With Partial Translation).
Iwanami Shoten, Publishers., "Dictionary of Chemistry", 4th Edition, 7th Printing, p. 364,Jul. 20, 1992 (With Partial Translation).
Office Action dated Dec. 7, 2021 with respect to the related Japanese patent application No. 2017-191821.
Office Action dated Jan. 6, 2022 with respect to the related Chinese patent application No. 201880076443.5.
Office Action dated Jan. 12, 2022 with respect to the related Chinese patent application No. 201880076801.2.
Extended European Search Report dated May 10, 2021 (EP Patent Application No. 18860865.7).
American Technical Publishers Ltd.: "ASM Ready Reference: Thermal Properties of Metals", Apr. 27, 2021 (Apr. 27, 2021), pp. 1-9, XP055799057, Retrieved from the Internet: URL:https://www.owlnet.rice.edu/~msci301/ThermalExpansion.pdf [retrieved on Apr. 27, 2021].
International Search Report for PCT/JP2018/035713 dated Dec. 11, 2018.
Office Action dated Oct. 8, 2020 (U.S. Appl. No. 16/758,506).
Extended European Search Report dated Jun. 17, 2021 with respect to the related European Patent Application No. 18863695.5.
Office Action dated Jun. 1, 2021 with respect to the related Chinese Patent Application No. 201880084755.0.
Office Action dated Dec. 7, 2021 with respect to the related Japanese patent application No. 2017-210571.
Office Action dated Sep. 27, 2021 with respect to the related Chinese patent application No. 201880089676.9.
International Search Report for PCT/JP2018/046854 dated Feb. 12, 2019.
Office Action dated Jan. 25, 2022 with respect to the related Japanese patent application No. 2017-246871.
Office Action dated Jan. 28, 2022 with respect to the related U.S. Appl. No. 16/955,329.
International Search Report for PCT/JP2019/014528 dated Jun. 25, 2019.
Shintaku, Kazuhiko, "Thin-film manufacturing by a sputtering method and its application", The 1st joint education workshop of National Institute of Technology, Akita College, [online], 2014, [retrieval date Jun. 17, 2019] Internet: URL:http://akita-nct.coop-edu.jp/assets/uploads/2014/12/6c13667c41571e8378dc2994ce1fcbd4.pdf, non-official translation, published on Dec. 9, 2014. With Partial English Translation.
Office Action dated Apr. 12, 2022 with respect to the related Japanese patent application No. 2018-052421.
Office Action dated Apr. 12, 2022 with respect to the related Japanese patent application No. 2018-052422.
Office Action dated May 3, 2022 with respect to the related U.S. Appl. No. 16/650,963.
Office Action dated Apr. 29, 2022 with respect to the related Chinese patent application No. 201880089676.9 (With Partial Translation).
Office Action dated May 5, 2022 with respect to the related Chinese patent application No. 201980022374.4 (With Partial Translation).
International Search Report for PCT/JP2018/035939 dated Dec. 18, 2018.
International Search Report for PCT/JP2018/040357 dated Jan. 15, 2019.
Office Action dated Dec. 7, 2021 with respect to the corresponding Japanese patent application No. 2020-098850.
Office Action dated Jan. 6, 2022 with respect to the corresponding Chinese patent application No. 201880076750.3.
Office Action dated Jan. 13, 2022 with respect to the related Chinese patent application No. 201880084755.0.
Extended European Search Report dated May 10, 2021 (EP Patent Application No. 18862478.7).
International Search Report for PCT/JP2018/035706 dated Dec. 11, 2018.
Japanese Office Action for 2017-191820 dated Mar. 17, 2020.
Office Action dated Jun. 6, 2022 with respect to the corresponding U.S. Appl. No. 17/043,898.
Office Action dated Feb. 4, 2023 with respect to the corresponding Chinese patent application No. 201980022374.4.
Office Action dated Feb. 7, 2023 with respect to the corresponding Japanese patent application No. 2017-210571.
Office Action dated Mar. 7, 2023 with respect to the corresponding Japanese patent application No. 2018-052422.
International Search Report for PCT/JP2019/041164 dated Jan. 21, 2020.
Office Action dated Mar. 23, 2022 with respect to the related Chinese patent application No. 201980069799.0.
Office Action dated Jun. 7, 2022 with respect to the related Japanese patent application No. 2020-553353.
Partial supplementary European search report dated Jun. 21, 2022 with respect to the related European patent application No. 19875503.5.
Extended European Search Report dated Sep. 22, 2022 with respect to the related European patent application No. 19875503.5.
Office Action dated Nov. 15, 2022 with respect to the related Japanese patent application No. 2020-553353.
Office Action dated Jan. 9, 2023 with respect to the related U.S. Appl. No. 17/929,830.

* cited by examiner

STRAIN GAUGE WITH IMPROVED STABILITY

TECHNICAL FIELD

The present invention relates to a strain gauge and a sensor module.

BACKGROUND ART

A strain gauge is known to be attached to a measured object to detect strain on the measured object. The strain gauge includes a resistor that detects strain, and as resistor material, for example, material including Cr (chromium) or Ni (nickel) is used. The resistor is formed on a substrate made of, for example, an insulating resin (see, for example, Patent document 1).

CITATION LIST

Patent Document

[Patent document 1] Japanese Unexamined Patent Application Publication No. 2016-74934

SUMMARY

However, when a flexible substrate is used, a stable resistor is not easily formed on the substrate, and thus there is a problem in instability of gauge characteristics (a gauge factor, a gauge factor temperature coefficient TCS, and a temperature coefficient of resistance TCR).

In view of the point described above, an object of the present invention is to improve stability of gauge characteristics of a strain gauge including a resistor formed above a flexible substrate.

A strain gauge includes a flexible substrate; a functional layer formed of a metal, an alloy, or a metal compound, on one surface of the substrate; a resistor formed of material including at least one from among chromium and nickel, on one surface of the functional layer; and an insulating resin layer with which the resistor is coated.

Effects of the Invention

According to the disclosed technique, with respect to a strain gauge including a resistor formed above a flexible substrate, stability of gauge characteristics can be improved.

DESCRIPTION OF EMBODIMENTS

One or more embodiments will be hereinafter described with reference to the drawings. In each figure, the same numerals denote the same components; accordingly, duplicative explanations may be omitted.

First Embodiment

Figure 1:
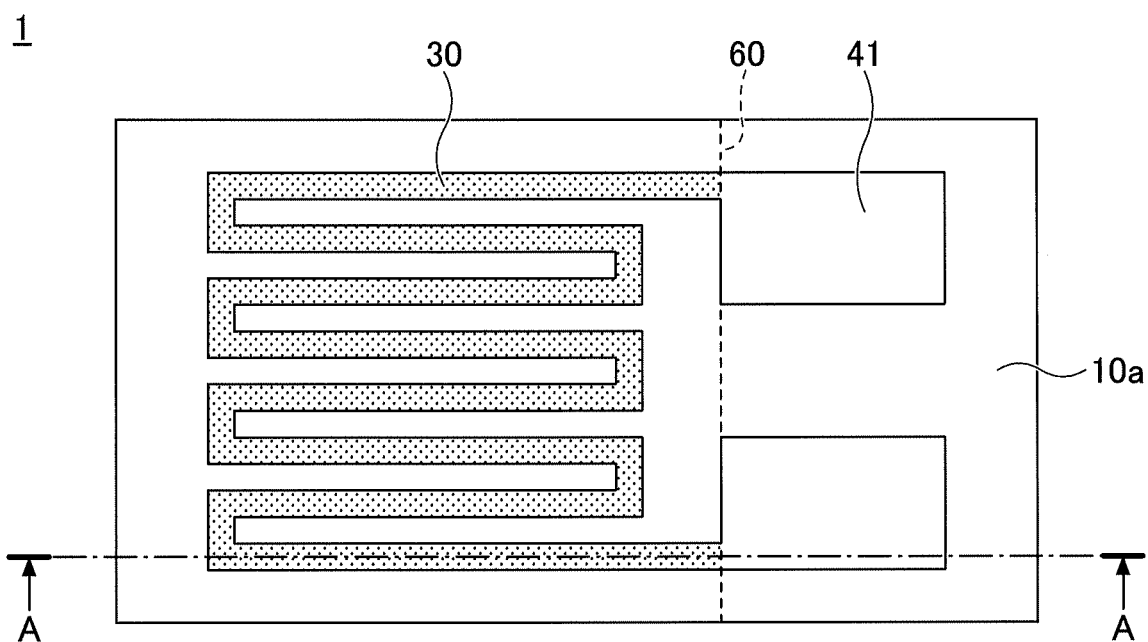
FIG. 1 is a plan view of an example of a strain gauge according to a first embodiment.
Figure 2:
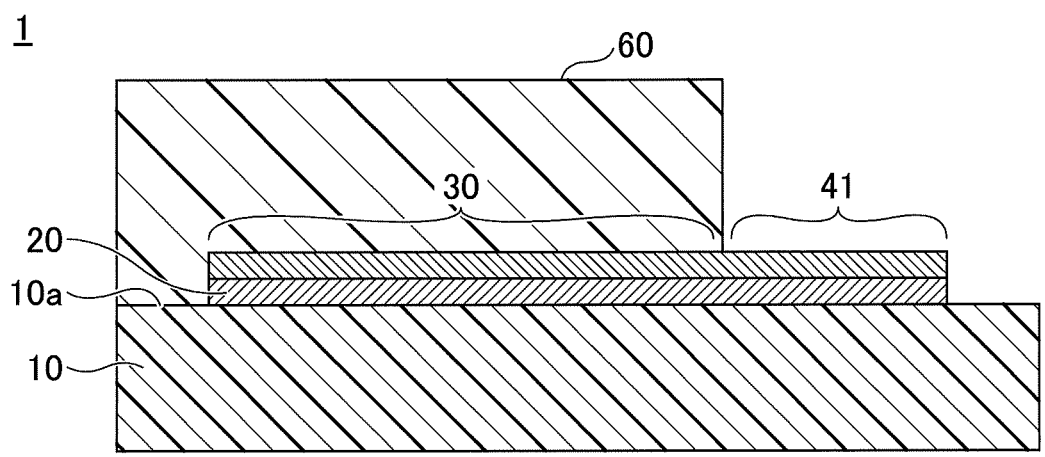
FIG. 2 is a cross-sectional view of an example of the strain gauge according to the first embodiment.

FIG. 1 is a plan view of an example of a strain gauge according to a first embodiment. FIG. 2 is a cross-sectional view of an example of the strain gauge according to the first embodiment, and illustrates a cross section taken along the A-A line in FIG. 1. With reference to FIGS. 1 and 2, the strain gauge 1 includes a substrate 10, a functional layer 20, a resistor 30, terminal sections 41, and a cover layer 60. Note that in FIG. 1, an outer edge of the cover layer 60 is only expressed by a dashed line in order to indicate the resistor 30, for the sake of convenience.

Note that in the present embodiment, for the sake of convenience, with respect to the strain gauge 1, the side of the substrate 10 where the resistor 30 is provided is referred to as an upper side or one side; and the side of the substrate 10 where the resistor 30 is not provided is referred to as a lower side or another side. Further, for each component, the surface on the side where the resistor 30 is provided is referred to as one surface or an upper surface; and the surface on the side where the resistor 30 is not provided is referred to as another surface or a lower surface. However, the strain gauge 1 can be used in a state of being upside down, or be disposed at any angle. Further, a plan view means that an object is viewed from a normal direction of an upper surface 10a of the substrate 10, and a planar shape refers to a shape of an object when viewed from the normal direction of the upper surface 10a of the substrate 10.

The substrate 10 is a member that is a base layer for forming the resistor 30 or the like and is flexible. The thickness of the substrate 10 is not particularly restricted, and can be appropriately selected for any purpose. For example, such a thickness can be approximately between 5 μm and 500 μm. In particular, when the thickness of the substrate 10 is between 5 μm and 200 μm, it is preferable in terms of strain transfer from a flexure element surface that is bonded to a lower surface of the substrate 10 via an adhesive layer or the like; and dimensional stability with respect to environment, and when the thickness is 10 μm or more, it is further preferable in terms of insulation.

The substrate 10 can be formed of an insulating resin film such as a PI (polyimide) resin, an epoxy resin, a PEEK (polyether ether ketone) resin, a PEN (polyethylene naphthalate) resin, a PET (polyethylene terephthalate) resin, a PPS (polyphenylene sulfide) resin, or a polyolefin resin. Note that the film refers to a flexible member having a thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

The functional layer 20 is formed, as a lower layer of the resistor 30, on the upper surface 10a of the substrate 10. In other words, a planar shape of the functional layer 20 is approximately the same as the planar shape of the resistor 30 illustrated in FIG. 1. The thickness of the functional layer 20 can be approximately between 1 nm and 100 nm, for example.

In the present application, the functional layer refers to a layer that has a function of promoting crystal growth of the resistor 30 that is at least an upper layer. The functional layer 20 preferably further has a function of preventing oxidation of the resistor 30 caused by oxygen and moisture included in the substrate 10, as well as a function of improving adhesion between the substrate 10 and the resistor 30. The functional layer 20 may further have other functions.

The insulating resin film that constitutes the substrate 10 contains oxygen and moisture. In this regard, particularly when the resistor 30 includes Cr (chromium), it is effective for the functional layer 20 to have a function of preventing oxidation of the resistor 30, because Cr forms an autoxidized film.

The material of the functional layer 20 is not particularly restricted as long as it is material having a function of promoting crystal growth of the resistor 30 that is at least an upper layer. Such material can be appropriately selected for any purpose, and includes one or more types of metals selected from a group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals from among the group; or a compound of any metal from among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

The resistor 30 is a thin film formed in a predetermined pattern and above the upper surface of the functional layer 20, and is a sensitive section where resistance varies according to strain. Note that in FIG. 1, for the sake of convenience, the resistor 30 is illustrated in a crepe pattern.

The resistor 30 can be formed of, for example, material including Cr (chromium); material including Ni (nickel); or material including both of Cr and Ni. In other words, the resistor 30 can be formed of material including at least one from among Cr and Ni. An example of the material including Cr includes a Cr composite film. An example of the material including nickel includes Cu—Ni (copper nickel). An example of the material including both of Cr and Ni includes Ni—Cr (nickel chromium).

Here, the Cr composite film is a composite film of Cr, CrN, $Cr_2N$, and the like. The Cr composite film may include incidental impurities such as chromium oxide. A portion of the material that constitutes the functional layer 20 may also be diffused into the Cr composite film. In this case, the material that constitutes the functional layer 20, and nitrogen may form a compound. For example, when the functional layer 20 is formed of Ti, the Cr composite film may include Ti or TiN (titanium nitride).

The thickness of the resistor 30 is not particularly restricted, and can be appropriately selected for any purpose. The thickness can be, for example, approximately between 0.05 μm and 2 μm. In particular, when the thickness of the resistor 30 is 0.1 μm or more, it is preferable in terms of improvement in crystallinity (e.g., crystallinity of α-Cr) of a crystal that constitutes the resistor 30, and when the thickness of the resistor 30 is 1 μm or less, it is further preferable in terms of reduction in cracks of a given film caused by internal stress of the film that constitutes the resistor 30, or reduction in warp in the substrate 10.

With the resistor 30 being formed on the functional layer 20, the resistor 30 can be formed by a stable crystalline phase and thus stability of gauge characteristics (a gauge factor, a gauge factor temperature coefficient TCS, and a temperature coefficient of resistance TCR) can be improved.

For example, when the resistor 30 is the Cr composite film, in a case of providing the functional layer 20, the resistor 30 can be formed with α-Cr (alpha-chromium) as the main component. Because α-Cr has a stable crystalline phase, the stability of the gauge characteristics can be improved.

Here, a main component means that a target substance has 50% by weight or more of total substances that constitute the resistor. When the resistor 30 is the Cr composite film, the resistor 30 preferably includes α-Cr of 80% by weight or more, from the viewpoint of improving the gauge characteristics. Note that α-Cr is Cr having a bcc structure (body-centered cubic structure).

Also, by diffusing a metal (e.g., Ti) that constitutes the functional layer 20 into the Cr composite film, the gauge characteristics can be improved. Specifically, the gauge factor of the strain gauge 1 can be 10 or more, as well as the gauge factor temperature coefficient TCS and temperature coefficient of resistance TCR can be each in the range of from −1000 ppm/° C. to +1000 ppm/° C.

Note that the expansion coefficient of the substrate 10 is preferably between 7 ppm/K and 20 ppm/K, from the viewpoint of reducing warp in the substrate 10, where the internal stress of the resistor 30 is assumed to be close to zero. The expansion coefficient of the substrate 10 can be adjusted by, for example, selecting the material of the substrate 10, selecting the material of the filler contained in the substrate 10, adjusting the content, and the like.

When the resistor 30 is formed above the substrate 10, pinholes may be generated in the resistor 30. If the number of pinholes generated in the resistor 30 exceeds a predetermined value, the gauge characteristics might deteriorate, or the resistor might not serve as a strain gauge. The inventors have recognized that one of causes of a pinhole being generated in the resistor 30 relates to filler protruding from the upper surface 10a of the substrate 10.

In other words, when the substrate 10 includes a filler, a portion of the filler protrudes from the upper surface 10a of the substrate 10, so that surface unevenness on the upper surface 10a of the substrate 10 increases. As a result, the number of pinholes that are generated in the resistor 30 formed above the upper surface 10a of the substrate 10 increases, which results in deterioration of the gauge characteristics, and the like.

The inventors have found that, when the thickness of the resistor 30 is 0.05 μm or more, in a case where the surface unevenness on the upper surface 10a of the substrate 10 is 15 nm or less, the number of pinholes that are generated in the resistor 30 can be suppressed to maintain the gauge characteristics.

In other words, when the thickness of the resistor 30 is 0.05 μm or more, the surface unevenness on the upper surface 10a of the substrate 10 is preferably 15 nm or less, from the viewpoint of reducing the number of pinholes that are generated in the resistor 30 formed above the upper surface 10a of the substrate 10 to maintain the gauge characteristics. When the surface unevenness is 15 nm or less, even in a case where the substrate 10 includes fillers, the gauge characteristics do not deteriorate. Note that the surface unevenness on the upper surface 10a of the substrate 10 may be 0 nm.

The surface unevenness on the upper surface 10a of the substrate 10 can be reduced by, for example, heating the substrate 10. Alternatively, instead of heating of the substrate 10, a method of scraping a protrusion by approximately vertically irradiating the upper surface 10a of the substrate 10 with laser light; a method of cutting a protrusion by moving a water cutter or the like to be parallel to the upper surface 10a of the substrate 10; a method of polishing the upper surface 10a of the substrate 10 with a grinding wheel; a method of pressing the substrate 10 while heating (heat press); or the like, may be used.

Note that the surface unevenness means arithmetical mean roughness, and is generally expressed by Ra. The surface unevenness can be measured by, for example, three-dimensional optical interferometry.

The terminal sections 41 respectively extend from both end portions of the resistor 30 and are each wider than the resistor 30 to be in an approximately rectangular shape, in a plan view. The terminal sections 41 are a pair of electrodes from which a change in a resistance value of the resistor 30 according to strain is output externally, where, for example, a lead wire for an external connection, or the like is joined.

For example, the resistor 30 extends zigzagged back and forth from one of the terminal sections 41 to another terminal section 41. The upper surface of each terminal section 41 may be coated with a metal allowing for better solderability than the terminal section 41. Note that for the sake of convenience, the resistor 30 and the terminal sections 41 are expressed by different numerals. However, the resistor and the terminal sections can be integrally formed of the same material, in the same process.

The cover layer 60 is an insulating resin layer, which is disposed on and above the upper surface 10a of the substrate 10, such that the resistor 30 is coated and the terminal sections 41 are exposed. With the cover layer 60 being provided, mechanical damage, and the like can be prevented from occurring in the resistor 30. Additionally, with the cover layer 60 being provided, the resistor 30 can be protected against moisture, and the like. Note that the cover layer 60 may be provided to cover the entire portion except for the terminal sections 41.

The cover layer 60 can be formed of an insulating resin such as a PI resin, an epoxy resin, a PEEK resin, a PEN resin, a PET resin, or a PPS resin, a composite resin (e.g., a silicone resin or a polyolefin resin). The cover layer 60 may contain fillers or pigments. The thickness of the cover layer 60 is not particularly restricted, and can be appropriately selected for any purpose. For example, the thickness may be approximately between 2 μm and 30 μm.

Figure 3A:
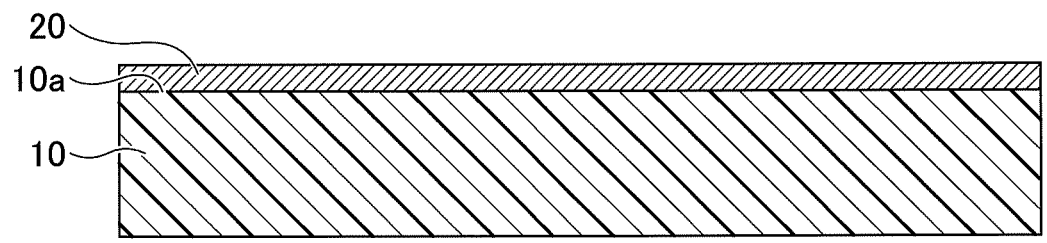
FIG. 3A is a diagram (part 1) illustrating an example of a process of manufacturing the strain gauge according to the first embodiment.
Figure 3B:
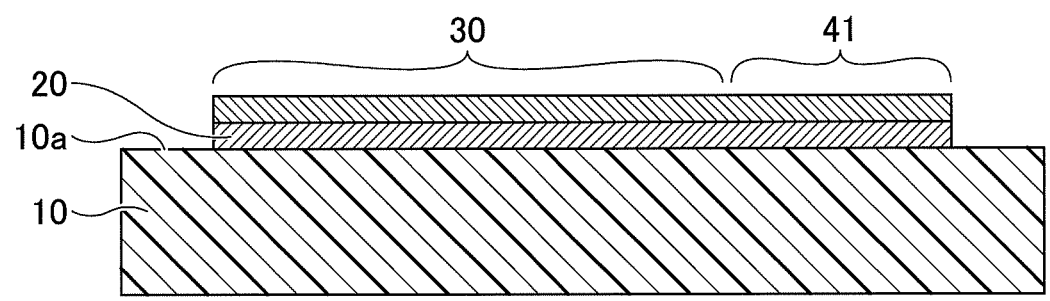
FIG. 3B is a diagram (part 2) illustrating an example of the process of manufacturing the strain gauge according to the first embodiment.
Figure 3C:
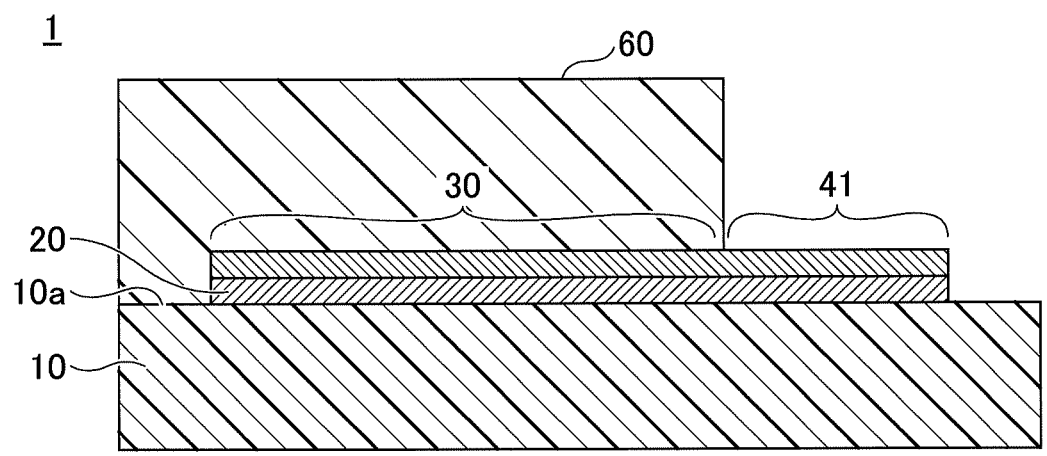
FIG. 3C is a diagram (part 3) illustrating an example of the process of manufacturing the strain gauge according to the first embodiment.

FIGS. 3A to 3C are diagrams illustrating a process of manufacturing the strain gauge according to the first embodiment, and each illustrate a cross section corresponding to FIG. 2. In order to manufacture the strain gauge 1, first, in the process illustrated in FIG. 3A, the substrate 10 is prepared and the functional layer 20 is formed on the upper surface 10a of the substrate 10. The material and thickness for each of the substrate 10 and the functional layer 20 are the same as the material and thickness described above.

The functional layer 20 can be vacuum-deposited by, for example, conventional sputtering in which a raw material capable of forming the functional layer 20 is the target and in which an Ar (argon) gas is supplied to a chamber. By using conventional sputtering, the functional layer 20 is deposited while the upper surface 10a of the substrate 10 is etched with Ar. Thus, a deposited amount of film of the functional layer 20 is minimized and thus an effect of improving adhesion can be obtained.

However, this is an example of a method of depositing the functional layer 20, and the functional layer 20 may be formed by other methods. For example, before depositing the functional layer 20, the upper surface 10a of the substrate 10 is activated by plasma treatment using Ar, etc. or the like to thereby obtain the effect of improving the adhesion; subsequently, the functional layer 20 may be vacuum-deposited by magnetron sputtering.

Next, in the process illustrated in FIG. 3B, the resistor 30 and the terminal sections 41 are formed on the entire upper surface of the functional layer 20, and then the functional layer 20, the resistor 30, and the terminal sections 41 are each patterned in the planar shape as illustrated in FIG. 1, by photolithography. The material and thickness for each of the resistor 30 and the terminal sections 41 are the same as the material and thickness described above. The resistor 30 and the terminal sections 41 can be integrally formed of the same material. The resistor 30 and the terminal sections 41 can be deposited by, for example, magnetron sputtering in which a raw material capable of forming the resistor 30 and the terminal sections 41 is a target. Instead of the magnetron sputtering, the resistor 30 and the terminal sections 41 may be deposited by reactive sputtering, vapor deposition, arc ion plating, pulsed laser deposition, or the like.

A combination of the material of the functional layer 20 and the material of the resistor 30 and the terminal sections 41 is not particularly restricted, and can be appropriately selected for any purpose. For example, Ti is used for the functional layer 20, and a Cr composite film formed with α-Cr (alpha-chromium) as the main component can be deposited as the resistor 30 and the terminal sections 41.

In this case, each of the resistor 30 and the terminal sections 41 can be deposited by, for example, magnetron sputtering in which a raw material capable of forming the Cr composite film is the target and in which an Ar gas is supplied to a chamber. Alternatively, the resistor 30 and the terminal sections 41 may be deposited by reactive sputtering in which pure Cr is the target and in which an appropriate amount of nitrogen gas, as well as an Ar gas, are supplied to a chamber.

In such methods, a growth face of the Cr composite film is defined by the functional layer 20 formed of Ti, and a Cr composite film that is formed with α-Cr as the main component having a stable crystalline structure can be deposited. Also, Ti that constitutes the functional layer 20 is diffused into the Cr composite film, so that the gauge characteristics are improved. For example, the gauge factor of the strain gauge 1 can be 10 or more, as well as the gauge factor temperature coefficient TCS and temperature coefficient of resistance TCR can be each in the range of from −1000 ppm/° C. to +1000 ppm/° C.

Note that when the resistor 30 is a Cr composite film, the functional layer 20 formed of Ti includes all functions being a function of promoting crystal growth of the resistor 30; a function of preventing oxidation of the resistor 30 caused by oxygen or moisture contained in the substrate 10; and a function of improving adhesion between the substrate 10 and the resistor 30. Instead of Ti, when the functional layer 20 is formed of Ta, Si, Al, or Fe, the functional layer also includes the same functions.

Next, in the process illustrated in FIG. 3C, the cover layer 60 is formed on and above the upper surface 10a of the substrate 10, such that the resistor 30 is coated and the terminal sections 41 are exposed. The material and thickness of the cover layer 60 are the same as the material and thickness described above. For example, the cover layer 60 can be fabricated, such that a thermosetting insulating resin film in a semi-cured state is laminated on the upper surface 10a of the substrate 10, and such that the resistor 30 is coated and the terminal sections 41 are exposed; subsequently, heat is added and curing is performed. The cover layer 60 may be formed, such that a thermosetting insulating resin that is liquid or paste-like is applied to the upper surface 10a of the substrate 10, and such that the resistor 30 is coated and the terminal sections 41 are exposed; subsequently, heat is added and curing is performed. In the above process, the strain gauge 1 is completed.

As described above, with the functional layer 20 being provided in the lower layer of the resistor 30, the crystal growth of the resistor 30 can be promoted and thus the resistor 30 having a stable crystalline phase can be fabricated. As a result, with respect to the strain gauge 1, the stability of the gauge characteristics can be improved. Also, the material that constitutes the functional layer 20 is diffused into the resistor 30, so that the gauge characteristics of the strain gauge 1 can be thereby improved.

<Modification 1 of the First Embodiment>

Modification 1 of the first embodiment provides an example of a strain gauge in which an insulating layer is provided in a lower layer of the cover layer. Note that in the modification 1 of the first embodiment, the explanation for the same components as the embodiment that has been described may be omitted.

Figure 4:
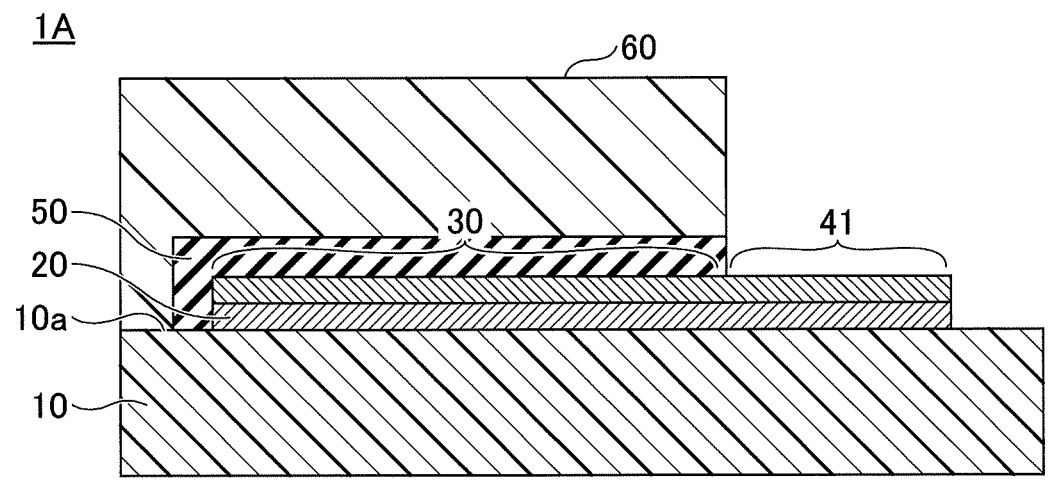
FIG. 4 is a cross-sectional view of an example of a strain gauge according to modification 1 of the first embodiment.

FIG. 4 is a cross-sectional view illustrating an example of the strain gauge according to the modification 1 of the first embodiment, and illustrates a cross section corresponding to FIG. 2. With reference to FIG. 4, the strain gauge 1A differs from the strain gauge 1 (see FIGS. 1 and 2, etc.) in that an insulating layer 50 is provided in the lower layer of the cover layer 60. Note that the cover layer 60 may be provided to cover all portions except for the terminal sections 41.

The insulating layer 50 is provided on and above the upper surface 10a of the substrate 10, such that the resistor 30 is coated and the terminal sections 41 are exposed. For example, the cover layer 60 can be provided to cover a portion of a side surface of the insulating layer 50, and an upper surface thereof.

The material of the insulating layer 50 is not particularly restricted as long as the material has higher resistance than the resistor 30 and the cover layer 60. The material can be appropriately selected for any purpose. For example, an oxide or a nitride, such as Si, W, Ti, or Ta, can be used. The thickness of the insulating layer 50 is not particularly restricted, and can be appropriately selected for any purpose. For example, the thickness can be approximately between 0.05 μm and 1 μm.

The method of forming the insulating layer 50 is not particularly restricted, and can be appropriately selected for any purpose. For example, a vacuum process such as sputtering or chemical vapor deposition (CVD), or, a solution process such as spin coating or a sol-gel process can be used.

In such a manner, with the insulating layer 50 being provided in the lower layer of the cover layer 60, insulation and environmental sealing can be improved in comparison to the case where the cover layer 60 alone is used. In such a manner, the insulating layer 50 can be appropriately provided according to a specification required for the insulation and environmental sealing.

Second Embodiment

The second embodiment provides an example of a strain gauge in which each electrode has a laminated structure. Note that in the second embodiment, the explanation for the same components as the embodiment that has been described may be omitted.

Figure 5:
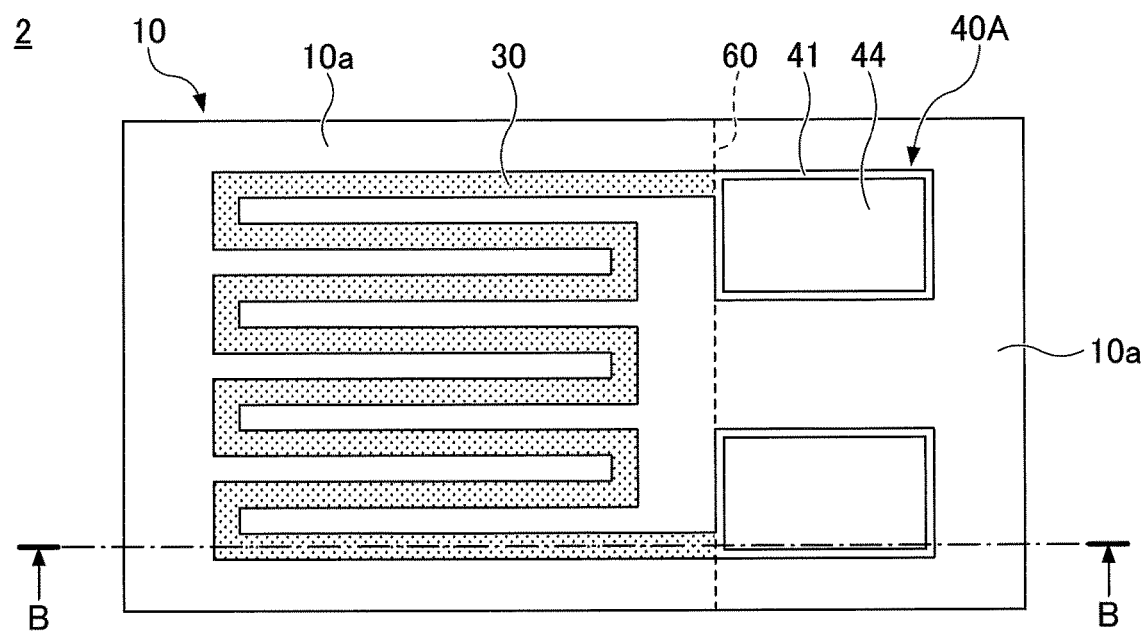
FIG. 5 is a plan view of an example of a strain gauge according to a second embodiment.
Figure 6:
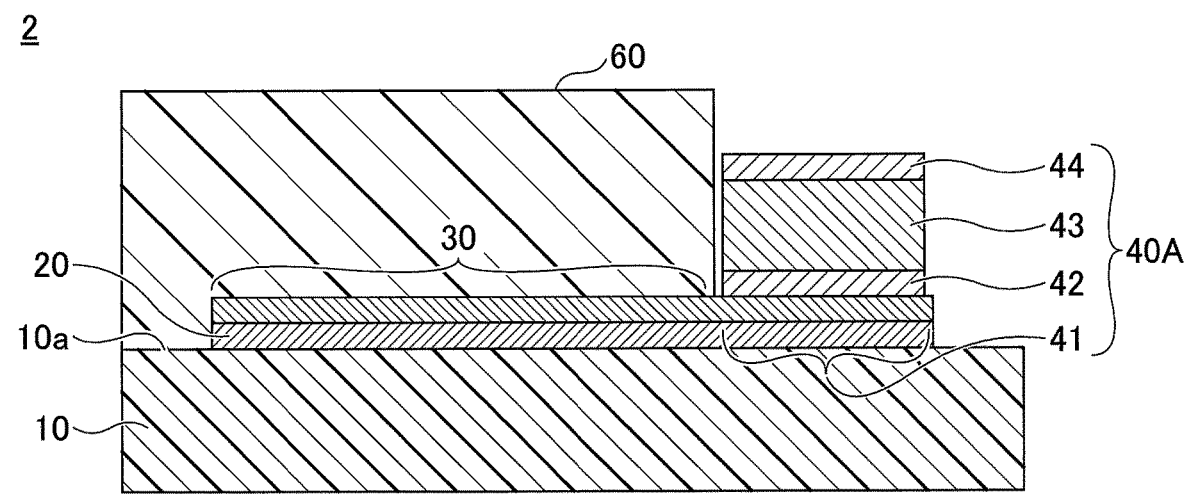
FIG. 6 is a cross-sectional view of an example of the strain gauge according to the second embodiment.

FIG. 5 is a plan view illustrating an example of a strain gauge according to the second embodiment. FIG. 6 is a cross-sectional view illustrating an example of the strain gauge according to the second embodiment, and illustrates a cross section taken along the line B-B in FIG. 5. With reference to FIGS. 5 and 6, the strain gauge 2 includes electrodes 40A in each of which a plurality of layers are laminated. Note that the cover layer 60 may be provided to cover all portions except for the electrodes 40A.

Each electrode 40A has a laminated structure in which a plurality of metallic layers are laminated. Specifically, each electrode 40A includes a terminal section 41 extending from a corresponding end portion from among both end portions of the resistor 30; a metallic layer 42 formed on an upper surface of the terminal section 41; a metallic layer 43 formed on an upper surface of the metallic layer 42; and a metallic layer 44 formed on an upper surface of the metallic layer 43.

The metallic layer 43 is a typical example of a first metallic layer according to the present invention, and the metallic layer 44 is a typical example of a second metallic layer according to the present invention.

The material of the metallic layer 42 is not particularly restricted, and can be appropriately selected for any purpose. For example, Cu (copper) can be used. The thickness of the metallic layer 42 is not particularly restricted, and can be appropriately selected for any purpose. For example, the thickness can be approximately in the range of from 0.01 μm to 1 μm.

Preferably, the material of the metallic layer 43 includes Cu, a Cu alloy, Ni, or a Ni alloy. The thickness of the metallic layer 43 is determined in consideration of solderability to the electrode 40A, and is preferably 1 μm or more, and more preferably 3 μm or more. When the material of the metallic layer 43 includes Cu, a Cu alloy, Ni, or a Ni alloy and the thickness of the metallic layer 43 is 1 μm or more, dissolution of metallization is ameliorated. Also, when the material of the metallic layer 43 includes Cu, a Cu alloy, Ni, or a Ni alloy and the thickness of the metallic layer 43 is 3 μm or more, dissolution of metallization is further ameliorated. Note that the thickness of the metallic layer 43 is preferably 30 μm or less in terms of ease of electrolytic plating.

Here, the dissolution of metallization means that the material constituting the electrode 40A is dissolved in solder for jointing the electrode 40A, and that the thickness of the electrode 40A is reduced or the material disappears. When the dissolution of metallization occurs, adhesion strength or tensile strength with a lead wire, or the like to be jointed to the electrode 40A may be reduced. Thus, it is preferable that no dissolution of metallization occur.

For the material of the metallic layer 44, material having better solder wettability than the metallic layer 43 can be selected. For example, when the material of the metallic layer 43 includes Cu, a Cu alloy, Ni, or a Ni alloy, the material of the metallic layer 44 can include Au (gold). When the surface of Cu, a Cu alloy, Ni, or a Ni alloy is coated with Au, oxidation and corrosion for Cu, a Cu alloy, Ni, or a Ni alloy can be prevented, as well as good solder wettability can be provided. Instead of Au, when the material of the metallic layer 44 includes Pt (platinum), the metallic layer 44 has the same effect. The thickness of the metallic layer 44 is not particularly restricted, and can be appropriately selected for any purpose. For example, the thickness can be approximately between 0.01 μm and 1 μm.

Note that each terminal section 41 is exposed around a given laminated section of the metallic layers 42, 43, and 44, in a plan view. However, each terminal section 41 may have the same planar shape as the laminated section of the metallic layers 42, 43, and 44.

FIGS. 7A to 8D illustrate a process of manufacturing a strain gauge according to a second embodiment, and illustrate a cross section corresponding to FIG. 6. In order to manufacture the strain gauge 2, a process that is similar to that in FIG. 3A according to the first embodiment is first performed, and then in the process illustrated in FIG. 7A, a metallic layer 300 is formed on an upper surface of the functional layer 20. The metallic layer 300 is a layer that is finally patterned to serve as the resistor 30 and terminal sections 41. In such a manner, the material and thickness of the metallic layer 300 are the same as the material and thickness for each of the above resistor 30 and terminal sections 41.

The metallic layer 300 can be deposited by magnetron sputtering in which, for example, a raw material capable of forming the metallic layer 300 is the target. Instead of the magnetron sputtering, the metallic layer 300 may be deposited by reactive sputtering, vapor deposition, arc ion plating, pulsed laser deposition, or the like.

Figure 7A:
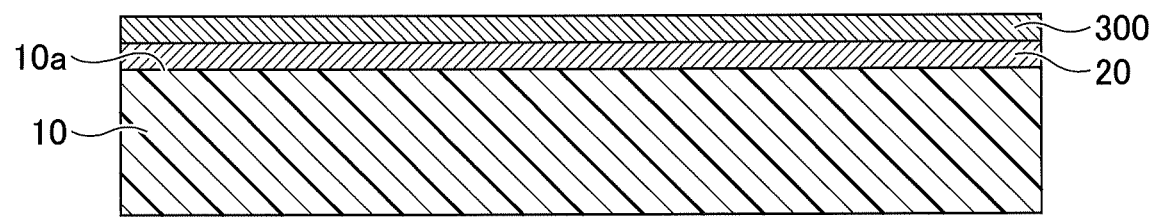
FIG. 7A is a diagram (part 1) illustrating an example of a process of manufacturing the strain gauge according to the second embodiment.
Figure 7B:
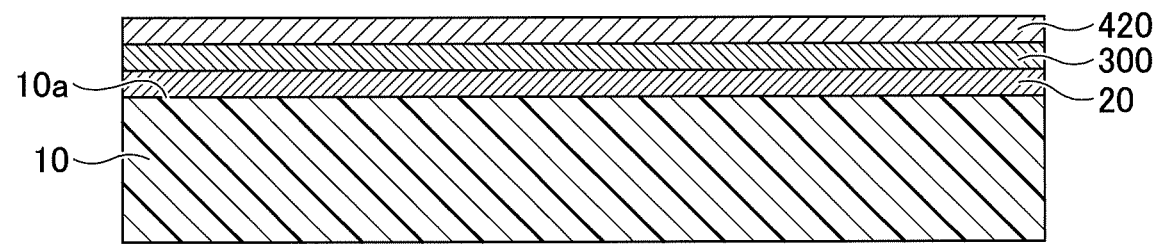
FIG. 7B is a diagram (part 2) illustrating an example of the process of manufacturing the strain gauge according to the second embodiment.

Next, in the process illustrated in FIG. 7B, a seed layer 420 as the metallic layer 42 is formed by, for example, sputtering, electroless plating, or the like, to cover an upper surface of the metallic layer 300.

Figure 7C:
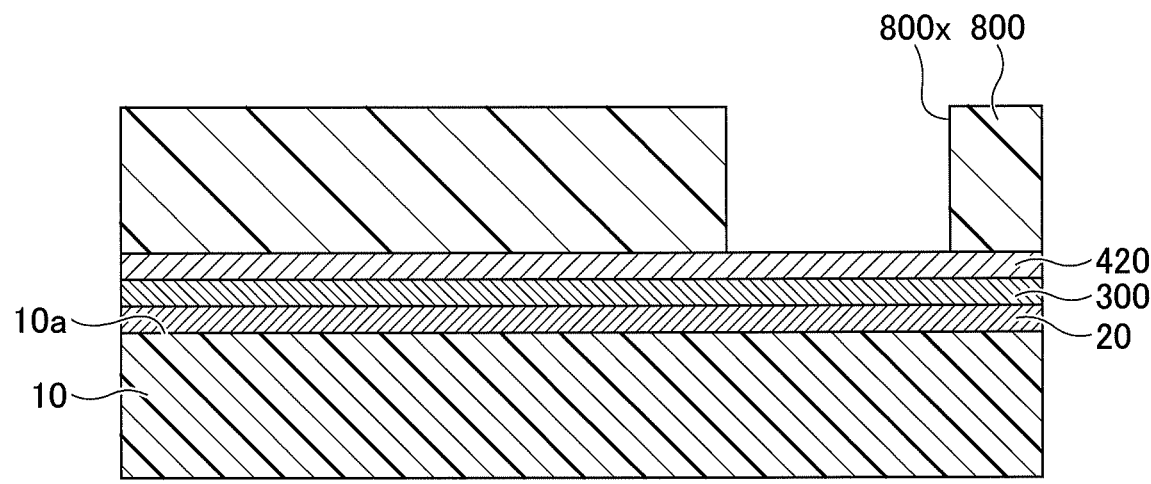
FIG. 7C is a diagram (part 3) illustrating an example of the process of manufacturing the strain gauge according to the second embodiment.

Next, in the process illustrated in FIG. 7C, a photosensitive resist 800 is formed on the entire upper surface of the seed layer 420, and by exposing and developing, an opening 800x for exposing a region in which each electrode 40A is to be formed is formed. As the resist 800, for example, a dry film resist, or the like can be used.

Figure 7D:
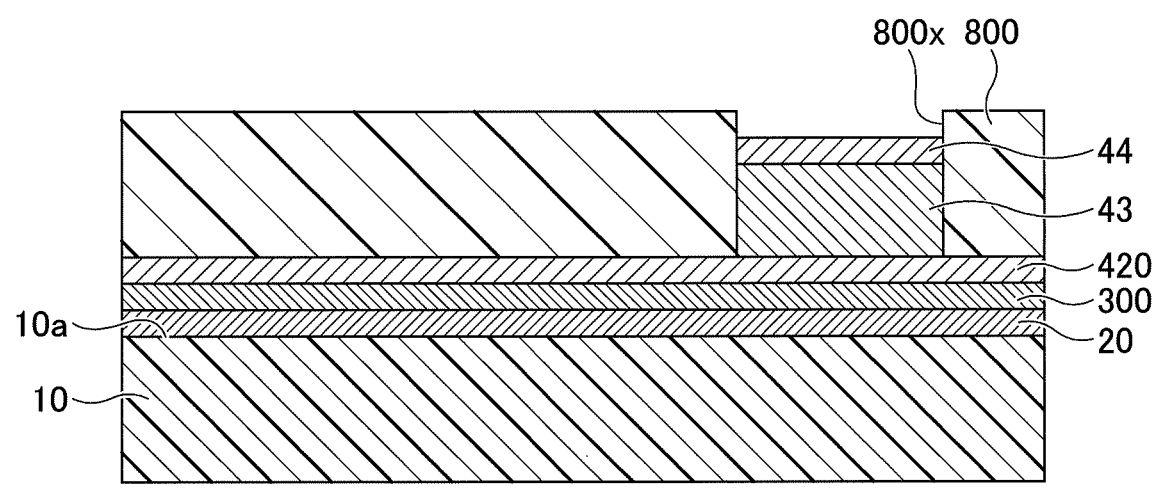
FIG. 7D is a diagram (part 4) illustrating an example of the process of manufacturing the strain gauge according to the second embodiment.

Next, in the process illustrated in FIG. 7D, a given metallic layer 43 is formed on the seed layer 420 that is exposed in the opening 800x, by for example, electrolytic plating in which the seed layer 420 is set as a power supply path, and further, a given metallic layer 44 is formed on the metallic layer 43. The electrolytic plating is suitable because it has high takt and allows for formation of a low stress electrolytic plating layer as the metallic layer 43. When the electrolytic plating layer whose thickness is increased has low stress, warp in the strain gauge 2 can be prevented. Note that the metallic layer 44 may be formed on the metallic layer 43, by electroless plating.

Note that in forming the metallic layer 44, side surfaces of the metallic layer 43 are coated with the resist 800, so that the metallic layer 44 is formed only on the upper surface of the metallic layer 43 and is not on the side surfaces thereof.

Figure 8A:
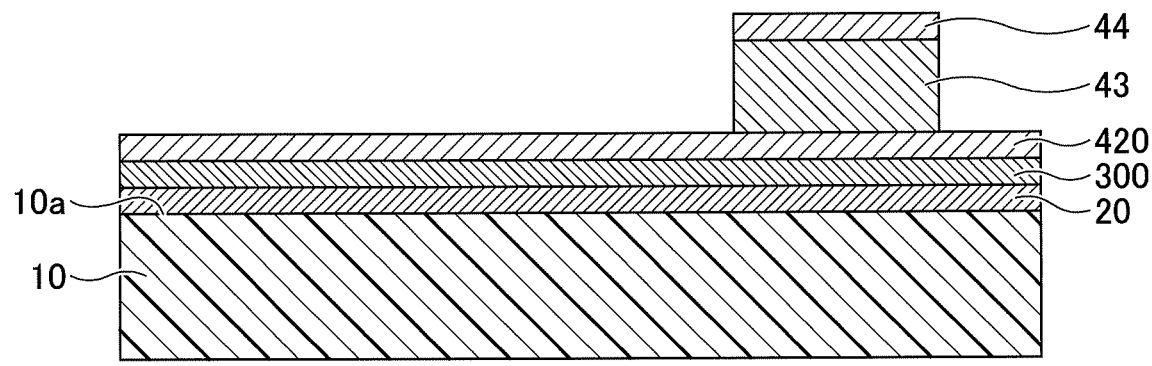
FIG. 8A is a diagram (part 5) illustrating an example of the process of manufacturing the strain gauge according to the second embodiment.

Next, in the process illustrated in FIG. 8A, the resist 800 illustrated in FIG. 7D is removed. The resist 800 can be removed by, for example, immersing the material of the resist 800 in a dissolvable solution.

Figure 8B:
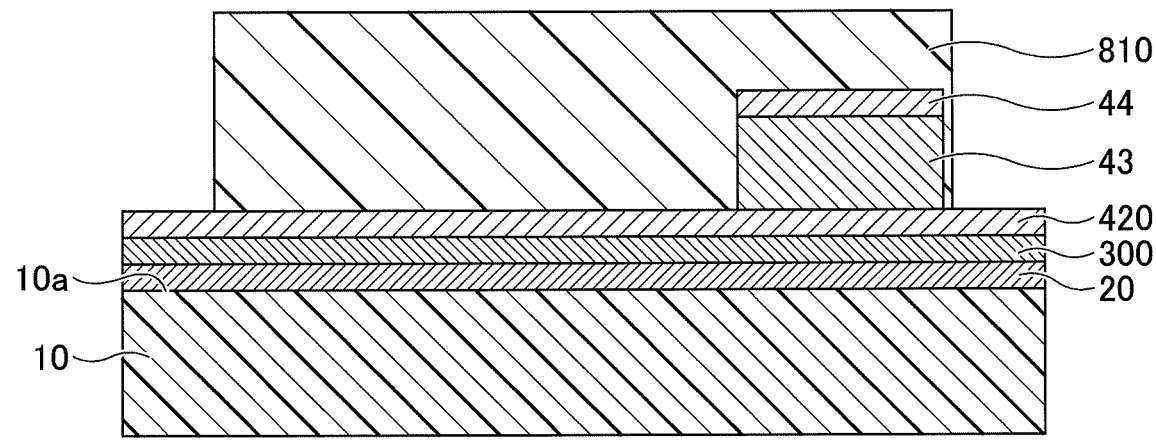
FIG. 8B is a diagram (part 6) illustrating an example of the process of manufacturing the strain gauge according to the second embodiment.

Next, in the process illustrated in FIG. 8B, a photosensitive resist 810 is formed on the entire upper surface of the seed layer 420, and by exposing and developing, a planar shape that is the same as that of the resistor 30 and terminal sections 41 in FIG. 5 is patterned. As the resist 810, for example, a dry film resist, or the like can be used.

Figure 8C:
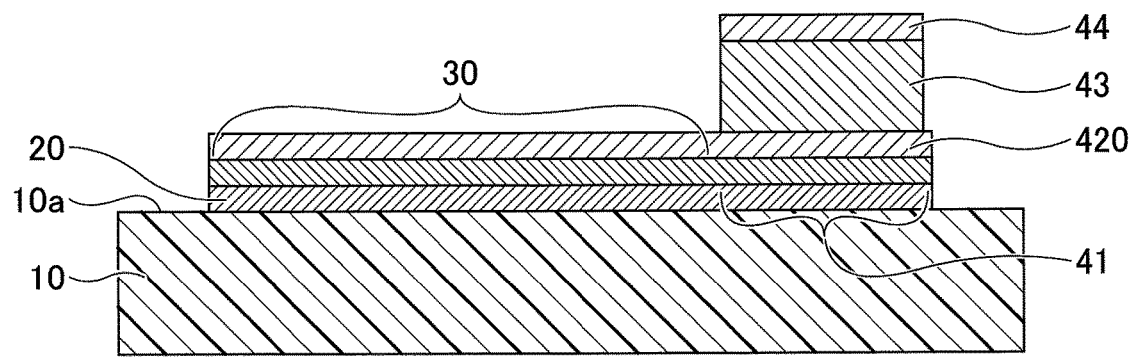
FIG. 8C is a diagram (part 7) illustrating an example of the process of manufacturing the strain gauge according to the second embodiment.

Next, in the process illustrated in FIG. 8C, the resist 810 is used as an etch mask, and the functional layer 20, the metallic layer 300, and the seed layer 420 that are exposed from the resist 810 are removed, so that the functional layer 20, the resistor 30, and the terminal sections 41 each of which has the planar shape in FIG. 5 are formed. For example, with wet etching, unwanted portions of the functional layer 20; the metallic layer 300; and the seed layer 420 can be removed. Note that at this point, the seed layer 420 is formed on the resistor 30.

Figure 8D:
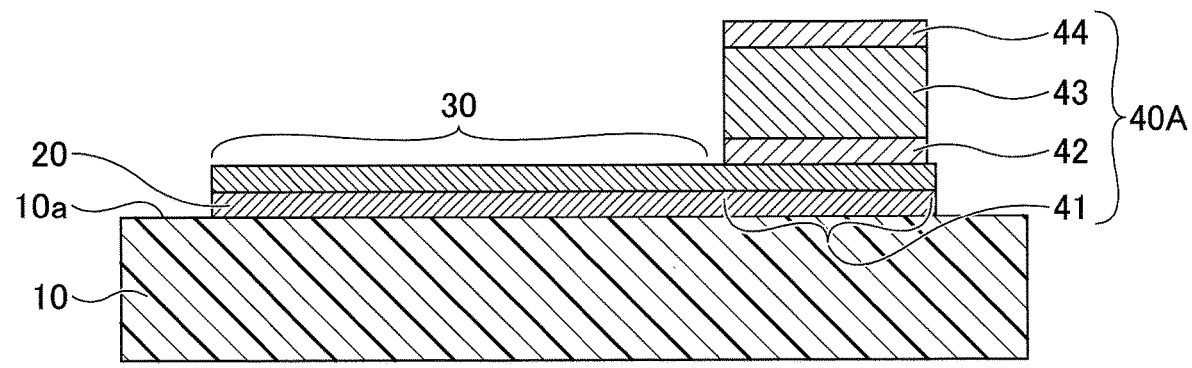
FIG. 8D is a diagram (part 8) illustrating an example of the process of manufacturing the strain gauge according to the second embodiment.

Next, in the process illustrated in FIG. 8D, the metallic layer 43 and the metallic layer 44 are used as etch masks, and an unwanted seed layer 420 that is exposed from the metallic layer 43 and the metallic layer 44 is removed, so that the metallic layer 42 is formed. For example, by wet etching using etching liquid with which the seed layer 420 is etched and with which the functional layer 20 and the resistor 30 are not etched, the unwanted seed layer 420 can be removed.

After the process illustrated in FIG. 8D, as is the case with the process in FIG. 3C, the cover layer 60 with which the resistor 30 is coated and that exposes the electrodes 40A is formed on and above the upper surface 10a of the substrate 10, so that the strain gauge 2 is completed.

As described above, as each electrode 40A, a given metallic layer 43 formed of a thick film (1 μm or more), which is formed of Cu, a Cu alloy, Ni, or a Ni alloy, is formed above a given terminal section 41, and further, a given metallic layer 44 formed of material (Au or Pt) that has better solder wettability than the metallic layer 43 is formed in the outermost surface layer. Thereby, dissolution of metallization can be prevented, as well as improving solder wettability.

<Modification 1 of the Second Embodiment>

Modification 1 of the second embodiment provides an example of electrodes each having a layer structure different from that in the second embodiment. Note that in the modification 1 of the second embodiment, the explanation for the same components as the embodiments that have been described may be omitted.

Figure 9:
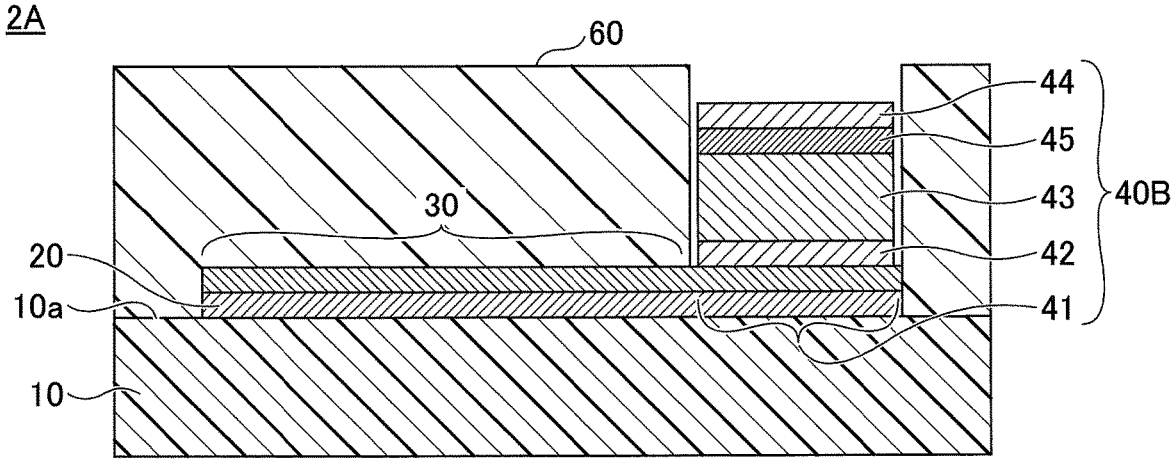
FIG. 9 is a cross-sectional view of an example of a strain gauge according to modification 1 of the second embodiment.

FIG. 9 is a cross-sectional view illustrating an example of a strain gauge according to the modification 1 of the second embodiment, and illustrates a cross section corresponding to FIG. 6. With reference to FIG. 9, the strain gauge 2A differs from the strain gauge 2 (see FIG. 6, etc.) in that the electrodes 40A are replaced with electrodes 40B. Additionally, the cover layer 60 is provided to approximately cover all portions except for the electrodes 40B, which differs from the strain gauge 2 (see FIG. 6, etc.).

Each electrode 40B has a laminated structure in which a plurality of metallic layers are laminated. Specifically, each electrode 40B includes a terminal section 41 extending from a corresponding end portion from among both end portions of the resistor 30; a metallic layer 42 formed on an upper surface of the terminal section 41; a metallic layer 43 formed on an upper surface of the metallic layer 42; a metallic layer 45 formed on an upper surface of the metallic layer 43; and a metallic layer 44 formed on an upper surface of the metallic layer 45. In other words, each electrode 40B has a structure in which the metallic layer 45 is provided between the metallic layer 43 and the metallic layer 44 of a given electrode 40A.

The material of the metallic layer 45 is not particularly restricted, and can be appropriately selected for any purpose. For example, Ni can be used. Instead of Ni, NiP (nickel phosphorus) or Pd may be used. Also, as the metallic layer 45, Ni/Pd (a metallic layer in which a Ni layer and a Pd layer are laminated in this order) may be used. The thickness of the metallic layer 45 is not particularly restricted, and can be appropriately selected for any purpose. For example, the thickness is approximately between 1 μm and 2 μm.

In the process illustrated in FIG. 7D, the metallic layer 45 can be formed on the metallic layer 43 by, for example, electrolytic plating in which the seed layer 420 is set as a power supply path.

In such a manner, the number of electrode layers is not particularly restricted, and the number of layers may be increased as necessary. In this case as well, a given metallic layer 43 formed of a thick film (1 μm or more), which is formed of Cu, a Cu alloy, Ni, or a Ni alloy, is formed above a given terminal section 41, and further, a given metallic layer 44 formed of material (Au or Pt) that has better solder wettability than the metallic layer 43 is formed in the outermost surface layer. Thereby, as is the case with the second embodiment, the dissolution of metallization can be prevented, as well as improving the solder wettability.

<Modification 2 of the Second Embodiment>

Modification 2 of the second embodiment provides another example of electrodes each having a different layer structure from that in the second embodiment. Note that in the modification 2 of the second embodiment, the explanation for the same components as the embodiments that have been described may be omitted.

Figure 10:
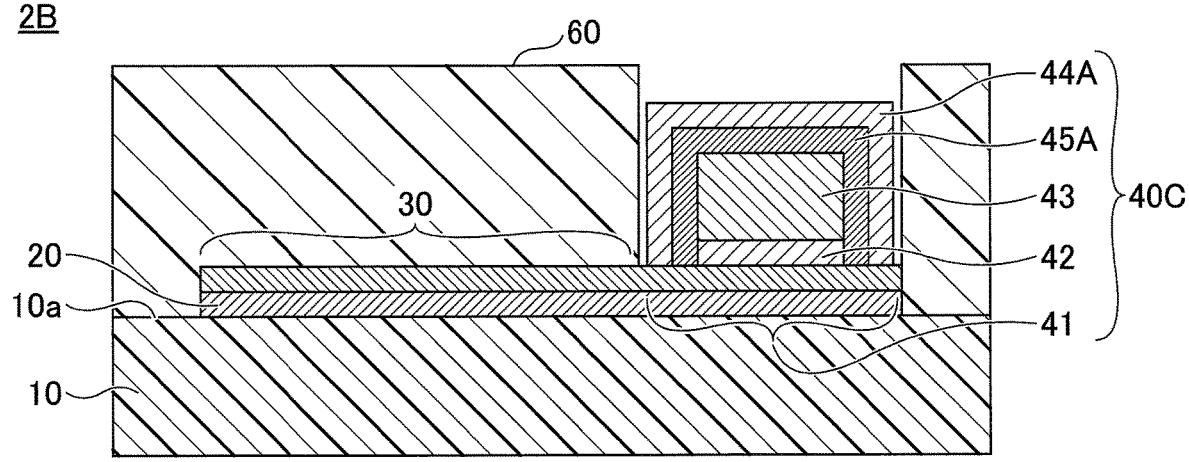
FIG. 10 is a cross-sectional view of an example of a strain gauge according to modification 2 of the second embodiment.

FIG. 10 is a cross-sectional view illustrating an example of a strain gauge according to the modification 2 of the second embodiment, and illustrates a cross section corresponding to FIG. 6. With reference to FIG. 10, the strain gauge 2B differs from the strain gauge 2A (see FIG. 9) in that the electrodes 40B are replaced with electrodes 40C. Additionally, the cover layer 60 is provided to approximately cover all portions except for the electrodes 40C, which differs from the strain gauge 2 (see FIG. 6, etc.).

Each electrode 40C has a laminated structure in which a plurality of metallic layers are laminated. Specifically, each electrode 40C includes a terminal section 41 extending from a corresponding end portion from among both end portions of the resistor 30; a metallic layer 42 formed on an upper surface of the terminal section 41; a metallic layer 43 formed on an upper surface of the metallic layer 42; a metallic layer 45A formed on an upper surface and side surfaces of the metallic layer 43 and on side surfaces of the metallic layer 42; and a metallic layer 44A formed on an upper surface and side surfaces of the metallic layer 45A. For example, the material and thickness for each of the metallic layers 44A and 45A can be the same as the material and thickness of the metallic layers 44 and 45. Note that the metallic layer 44A is a typical example of a second metallic layer according to the present invention.

In order to form each electrode 40C, first, in the process illustrated in FIG. 7D, for example, a given metallic layer 43 is formed by, for example, electrolytic plating in which the seed layer 420 is set as a power supply path, and then the resist 800 is removed as is the case with the process illustrated in FIG. 8A, without forming a given metallic layer 44. Next, the same process as that in FIGS. 8B to 8D is performed. Subsequently, a given metallic layer 45A can be formed on the upper surface and side surfaces of the metallic layer 43 and on the side surfaces of the metallic layer 42, by electroless plating, for example. Additionally, a given metallic layer 44A can be formed on the upper surface and side surfaces of the metallic layer 45A, by electroless plating, for example.

As described above, each electrode can be fabricated by appropriately using both of electrolytic plating and electroless plating. In the structure of each electrode 40C, a given metallic layer 43 formed of a thick film (1 μm or more), which is formed of Cu, a Cu alloy, Ni, or a Ni alloy, is formed above a given terminal section 41, and further, a given metallic layer 44A formed of material (Au or Pt) that has better solder wettability than the metallic layer 43 is formed in the outermost layer. Note, however, that the metallic layer 44A of the outermost layer is formed, via the metallic layer 45A, toward the side surfaces of each of the metallic layers 42 and 43, in addition to the upper surface of the metallic layer 43. Thus, in comparison to the electrodes 40A or the electrodes 40B, the effect of preventing oxidation and corrosion of Cu, a Cu alloy, Ni, or a Ni alloy that constitutes the metallic layer 43 can be further enhanced, as well as the solder wettability can be further improved.

Note that the same effect is obtained even when a given metallic layer 44A is formed directly on the upper surface and side surfaces of a given metallic layer 43 and on the side surfaces of a given metallic layer 42, without forming a given metallic layer 45A. In other words, the metallic layer 44A may directly or indirectly cover the upper surface and side surfaces of the metallic layer 43 and the side surfaces of the metallic layer 42.

Third Embodiment

A third embodiment provides an example of a sensor module using a strain gauge. Note that in the third embodiment, the explanation for the same components as the embodiments that have been described may be omitted.

Figure 11:
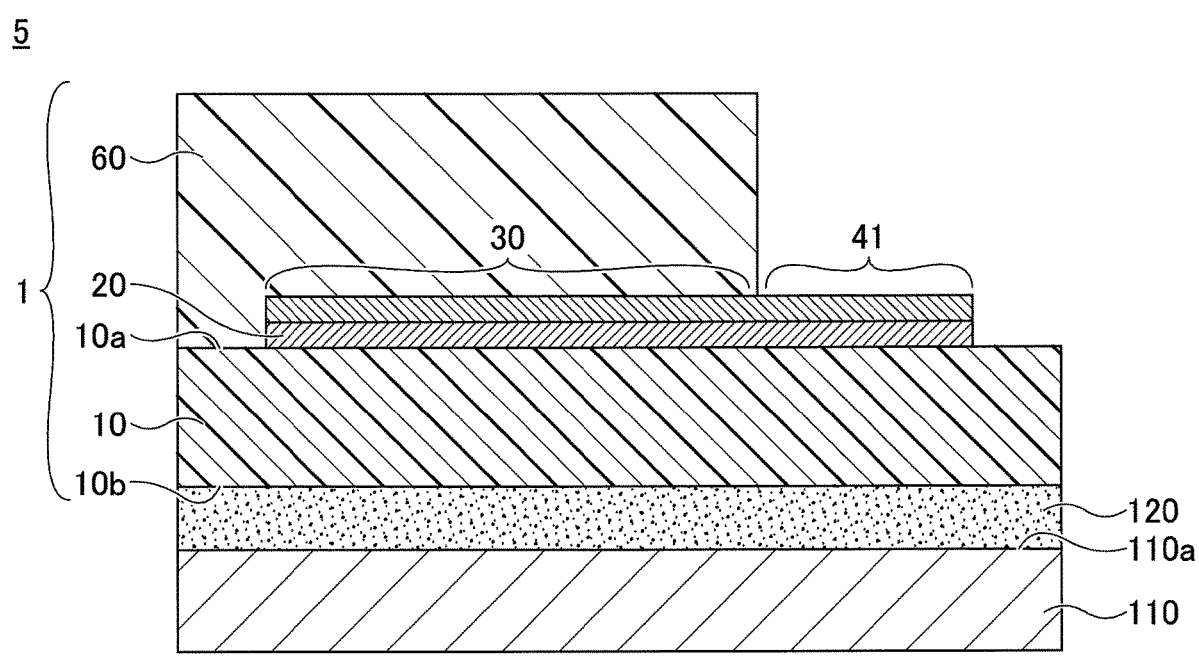
FIG. 11 is a cross-sectional view of an example of a sensor module according to a third embodiment.

FIG. 11 is a cross-sectional view illustrating an example of the sensor module according to the third embodiment, and illustrates a cross section corresponding to FIG. 2. With reference to FIG. 11, the sensor module 5 includes the strain gauge 1, a flexure element 110, and an adhesive layer 120. Note that the cover layer 60 may be provided to cover all portions except for the terminal sections 41.

In the sensor module 5, an upper surface 110a of the flexure element 110 is secured to the lower surface 10b of the substrate 10, via the adhesive layer 120. For example, the flexure element 110 is an object that is formed of a metal such as Fe, SUS (stainless steel), or Al, or, a resin such as PEEK, and that is deformed (causes strain) according to a force that is applied. The strain gauge 1 can detect strain generated in the flexure element 110, as a change in a resistance value of the resistor 30.

The material of the adhesive layer 120 is not particularly restricted as long as it has a function of securing the flexure element 110 to the strain gauge 1. The material can be appropriately selected for any purpose. For example, an epoxy resin, a modified epoxy resin, a silicone resin, a modified silicone resin, a urethane resin, a modified urethane resin, or the like can be used. Also, material such as a bonding sheet may be used. The thickness of the adhesive layer 120 is not particularly restricted, and can be appropriately selected for any purpose. For example, the thickness can be approximately between 0.1 μm and 50 μm.

In order to manufacture the sensor module 5, after the strain gauge 1 is fabricated, for example, any material described above, which constitutes the adhesive layer 120, is applied to the lower surface 10b of the substrate 10 and/or the upper surface 110a of the flexure element 110. Then, the lower surface 10b of the substrate 10 is situated facing the upper surface 110a of the flexure element 110, and the strain gauge 1 is disposed above the flexure element 110, through the applied material. Alternatively, the bonding sheet may be interposed between the flexure element 110 and the substrate 10.

Next, the strain gauge 1 is heated to a predetermined temperature while being pressed toward the flexure element 110, and the applied material is cured, so that the adhesive layer 120 is formed. Thereby, the lower surface 10b of the substrate 10 is secured to the upper surface 110a of the flexure element 110, through the adhesive layer 120, so that the sensor module 5 is completed. For example, the sensor module 5 can be applied in measurement of load, pressure, torque, acceleration, or the like.

Note that for the sensor module 5, the strain gauge 1A, 2, 2A, or 2B may be used instead of the strain gauge 1.

Example 1

First, in an advance test, Ti as the functional layer was vacuum-deposited on the upper surface 10a of the substrate 10 formed of a polyimide resin that had a thickness of 25 μm, by conventional sputtering. In this case, five samples for each of which Ti was deposited were fabricated in order to target multiple film thicknesses.

Figure 12:
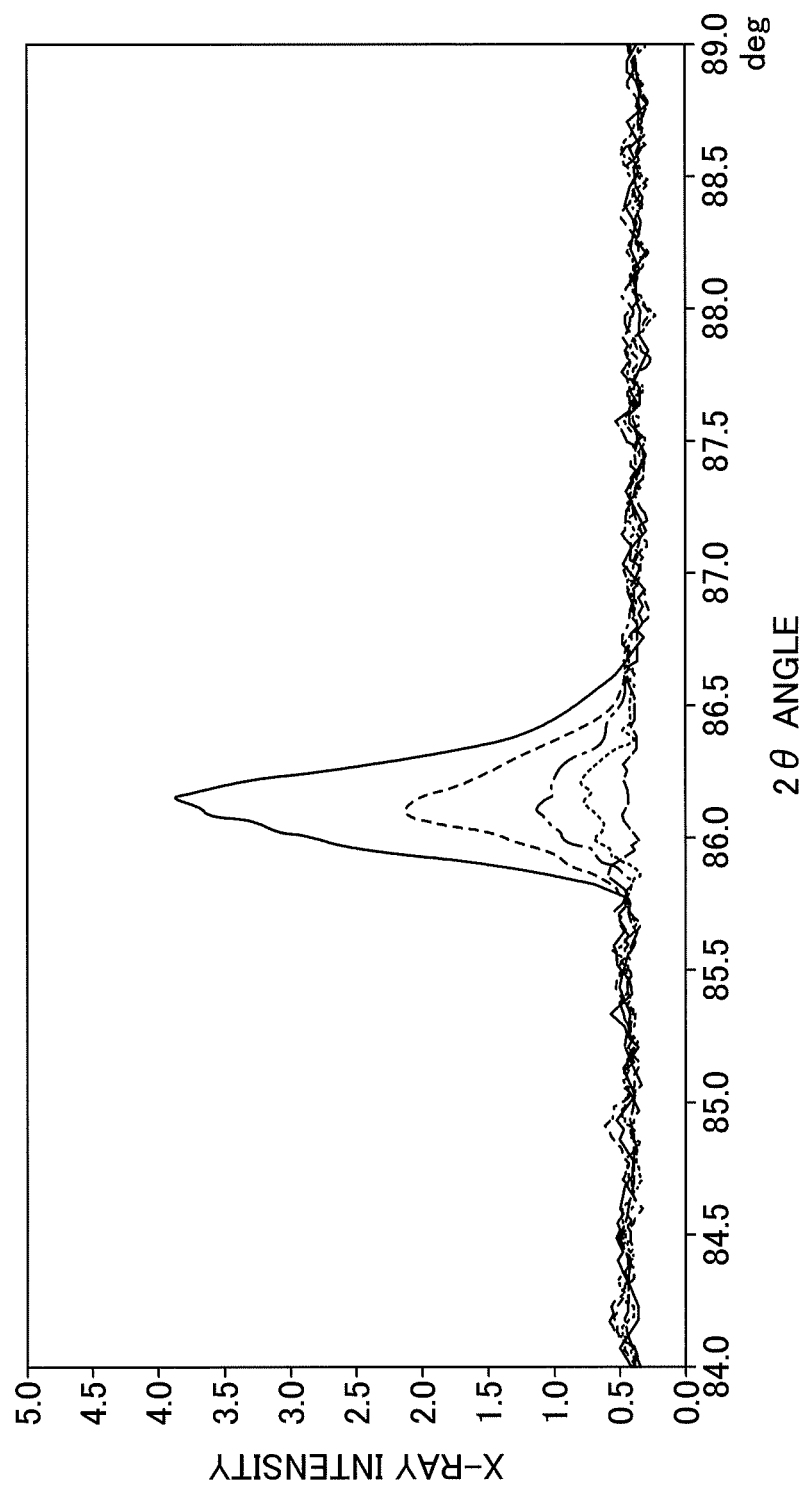
FIG. 12 is a diagram illustrating a result of X-ray fluorescent analysis for a functional layer.

Next, for the fabricated five samples, X-ray fluorescence (XRF) analysis was performed to obtain the result as illustrated in FIG. 12. From an X-ray peak in FIG. 12, it was confirmed that Ti was present, and from X-ray intensity of each sample at the X-ray peak, it was confirmed that a film thickness of a given Ti film could be controlled to be in the range of from 1 nm to 100 nm.

Next, in Example 1, Ti as the functional layer 20, which had a film thickness of 3 nm, was vacuum-deposited on the upper surface 10a of the substrate 10 formed of a polyimide resin that had a thickness of 25 μm, by conventional sputtering.

Subsequently, a Cr composite film, as the resistor 30 and the terminal sections 41, was deposited on the entire upper surface of the functional layer 20, by magnetron sputtering, and then the functional layer 20, the resistor 30, and the terminal sections 41 were patterned by photolithography, as illustrated in FIG. 1.

In comparative example 1, without forming the functional layer 20, a Cr composite film, as the resistor 30 and the terminal sections 41, was deposited on the upper surface 10a of the substrate 10 formed of a polyimide resin that had a thickness of 25 μm, by magnetron sputtering. Then, patterning was performed by photolithography, as illustrated in FIG. 1. Note that for the sample used in Example 1 and the sample used in comparative example 1, all deposition conditions for the resistor 30 and the terminal sections 41 are the same.

Figure 13:
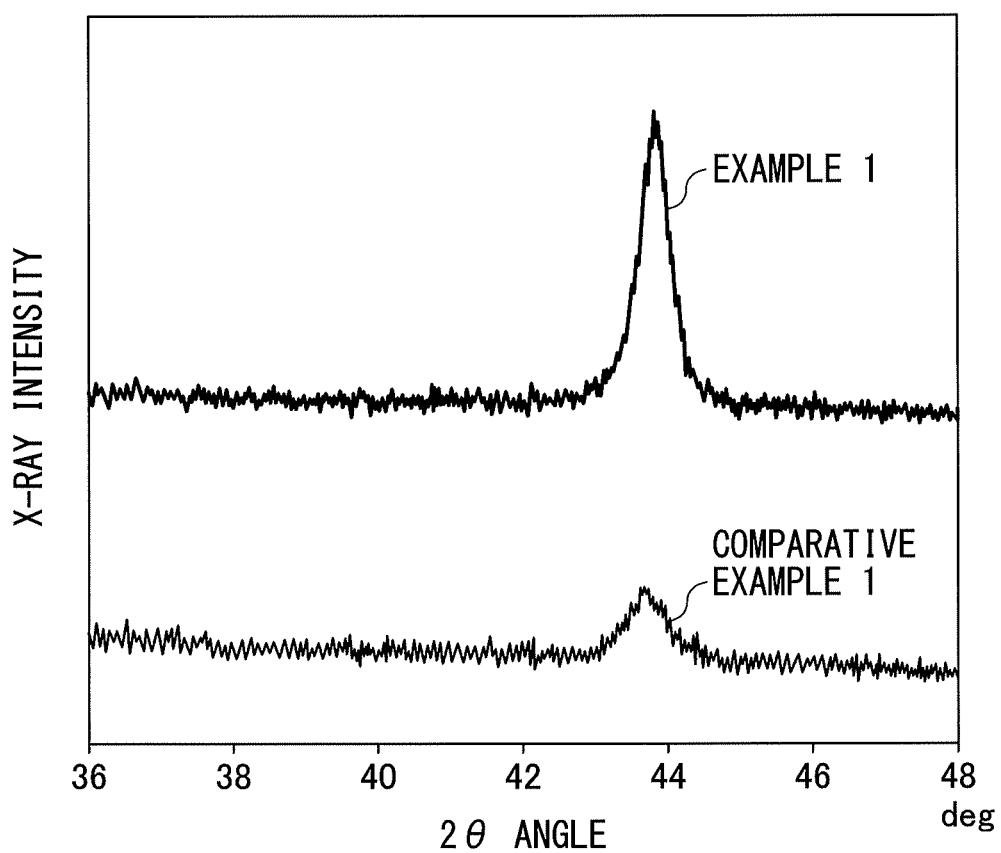
FIG. 13 is a diagram illustrating a result of X-ray diffraction for a resistor.

Next, for a given sample used in Example 1 and a given sample used in comparative example 1, X-ray diffraction evaluation was performed to obtain the result illustrated in FIG. 13. FIG. 13 illustrates an X-ray diffraction pattern at a diffraction angle of 2θ being in the range of from 36 to 48 degrees, and a diffraction peak in Example 1 is shifted to the right in comparison to a diffraction peak in comparative example 1. Further, the diffraction peak in Example 1 is greater than the diffraction peak in comparative example 1.

The diffraction peak in Example 1 is situated in proximity to a diffraction line of α-Cr (110). This is considered that when the functional layer 20 formed of Ti was provided, crystal growth of α-Cr was promoted to thereby form a Cr composite film with α-Cr as the main component.

Next, multiple samples used in Example 1 and comparative example 1 were fabricated, and gauge characteristics were measured. As a result, a gauge factor for each sample in Example 1 was between 14 and 16. In contrast, a gauge factor for each sample in comparative example 1 was less than 10.

Also, for each sample in Example 1, the gauge factor temperature coefficient TCS and temperature coefficient of resistance TCR were each in the range of from −1000 ppm/° C. to +1000 ppm/° C. In contrast, for each sample in comparative example 1, the gauge factor temperature coefficient TCS and temperature coefficient of resistance TCR were not each in the range of from −1000 ppm/° C. to +1000 ppm/° C.

As described above, with the functional layer 20 formed of Ti being provided, crystal growth of α-Cr was promoted and a Cr composite film was formed with α-Cr as the main component, so that a strain gauge that had a gauge factor of 10 or more, and that had the gauge factor temperature coefficient TCS and temperature coefficient of resistance TCR being each in the range of from −1000 ppm/° C. to +1000 ppm/° C., was fabricated. Note that the diffusion effect of Ti into the Cr composite film is considered to cause the improvement in the gauge characteristics.

Example 2

In Example 2, multiple substrates 10 each formed of a polyimide resin that had a thickness of 25 μm and that had a different expansion coefficient were prepared. Then, when a Cr-composite film, as a given resistor 30, was deposited, a relationship between an expansion coefficient of a given substrate 10 and internal stress of the resistor 30 was checked, to thereby obtain the result illustrated in FIG. 14.

The internal stress of the resistor 30 was estimated by measuring warp in an evaluation sample and using the Stoney formula given by Formula (1). Note that as can be seen from Formula (1), the internal stress of the resistor 30 illustrated in FIG. 14 indicates a value per unit thickness and does not depend on the thickness of the resistor 30.

[Math. 1]

$$\text{INTERNAL STRESS} = ED2/6(1-v)tR \quad (1)$$

Note that in Formula (1), E denotes Young's modulus, v denotes Poisson's ratio, D denotes the thickness of the substrate 10, t denotes the thickness of the resistor 30, and R denotes change in radius of curvature in the substrate 10.

Figure 14:
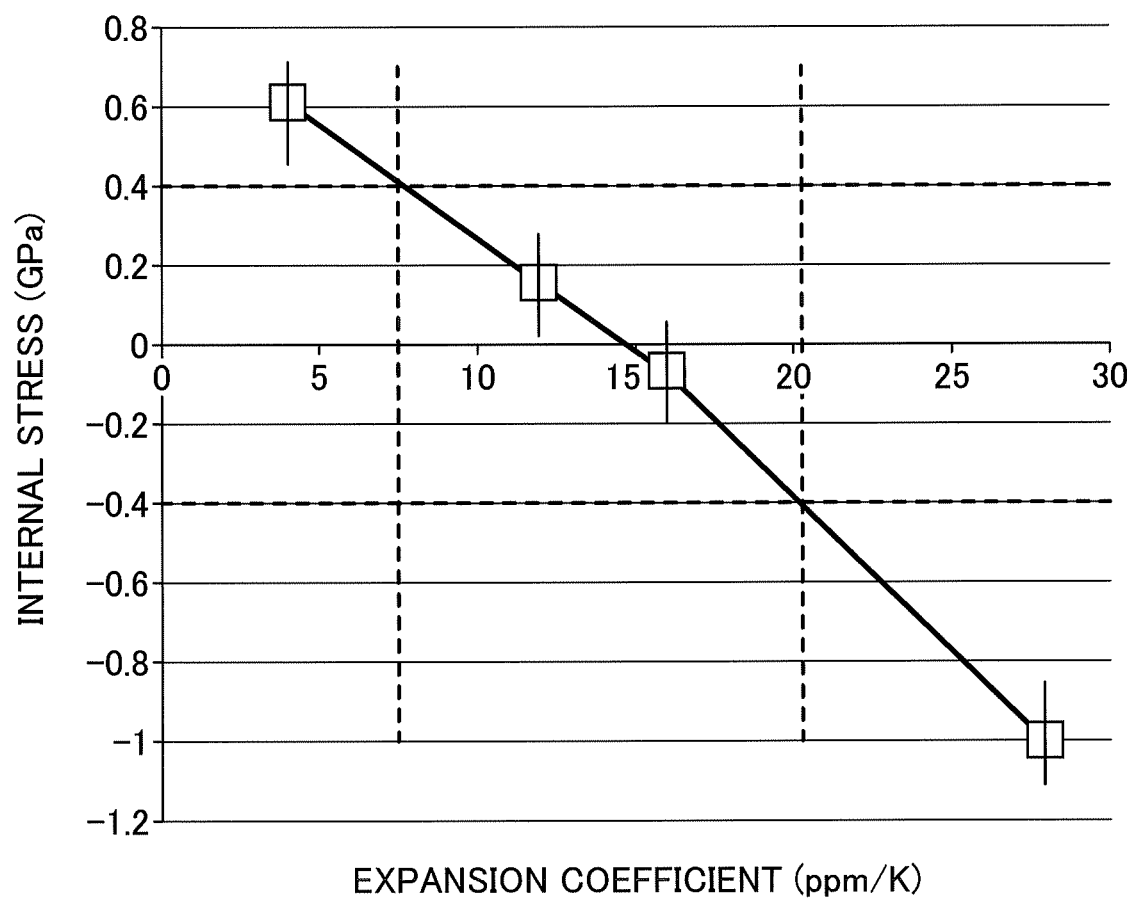
FIG. 14 is a diagram illustrating a relationship between an expansion coefficient of a substrate and internal stress of a resistor.

From FIG. 14, when the expansion coefficient of the substrate 10 is in the range of from 7 ppm/K to 20 ppm/K, the internal stress of the resistor 30 can be maintained to be in the range of ±0.4 GPa. Where, ±0.4 GPa indicates values expressing a permittable warp in the strain gauge 1 for functioning, and was experimentally determined by the inventors.

In other words, when the expansion coefficient of the substrate 10 is out of the range of from 7 ppm/K to 20 ppm/K, the internal stress of the resistor 30 is out of the range of ±0.4 GPa and thus warp in the strain gauge 1 would increase, so that the strain gauge 1 would not function as a strain gauge. Therefore, the expansion coefficient of the substrate 10 is required to be in the range of from 7 ppm/K to 20 ppm/K. Note that the material of the substrate 10 does not necessarily include a polyimide resin.

The expansion coefficient of the substrate 10 can be in the range of from 7 ppm/K to 20 ppm/K, by selecting the material of the substrate 10, selecting the material of the filler contained in the substrate 10, adjusting the content, and the like.

As described above, with the expansion coefficient of the substrate 10 being in the range of from 7 ppm/K to 20 ppm/K, a difference in the expansion coefficient between the substrate 10 and the resistor 30, as well as other factors, are absorbed, so that the internal stress of the resistor 30 can be in the range of ±0.4 GPa. As a result, warp in the strain gauge 1 is reduced to thereby cause the strain gauge 1 to be able to function stably in a manner such that good gauge characteristics are maintained.

Example 3

In Example 3, multiple substrates 10 each formed of a polyimide resin that had a thickness of 25 μm and that contained fillers were prepared. Three sets of samples, each of which included a sample not being subject to heat treatment; a sample being subject to heat treatment at a temperature of 100° C.; a sample being subject to heat treatment at a temperature of 200° C.; and a sample being subject to heat treatment at a temperature of 300° C., were fabricated. Then, the samples were returned to be at normal temperature, and surface unevenness on the upper surface 10a of each substrate 10 was measured by three-dimensional optical interference.

Next, the resistor 30 having a film thickness of 0.05 μm was deposited on the upper surface 10a of each substrate 10, by magnetron sputtering, and patterning was performed by photolithography, as illustrated in FIG. 1. Then, the number of pinholes that were generated in the resistor 30 was measured by a light transmission method in which light was transmitted from a back surface of a given sample.

Figure 15:
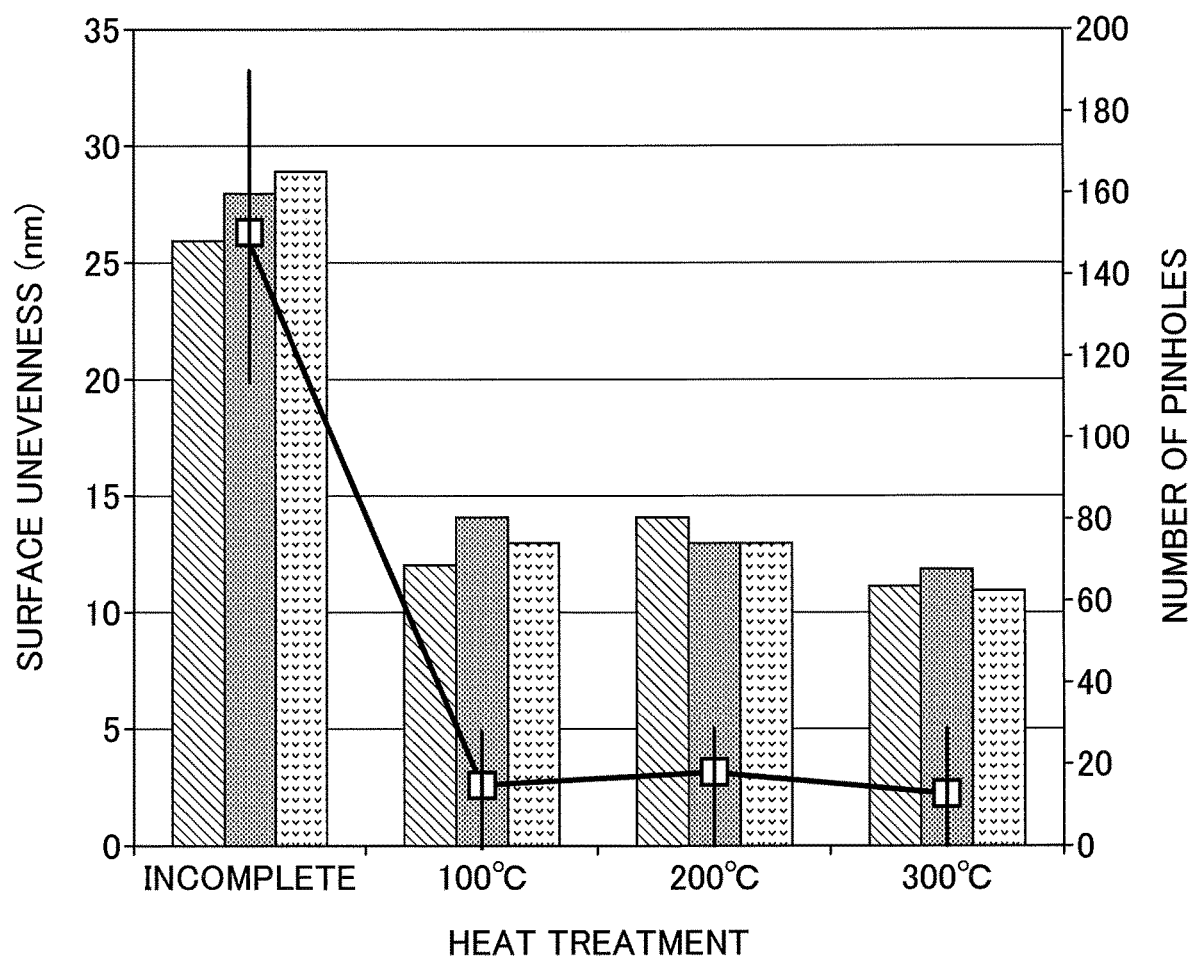
FIG. 15 is a diagram illustrating a relationship between surface unevenness of a substrate and the number of pinholes of a resistor.

Next, based on a measured result, a relationship between surface unevenness on the upper surface 10a of a given substrate 10 and the number of pinholes that were generated in a given resistor 30 was summarized in FIG. 15. Note that each bar graph illustrated in FIG. 15 shows surface unevenness, and a line graph shows the number of pinholes. Additionally, for the horizontal axis, 100° C., 200° C., and 300° C. each indicate a temperature when a given substrate 10 was subject to heat treatment, and Incomplete indicates that heat treatment is not carried out.

FIG. 15 indicates that when a given substrate 10 is heated at temperatures between 100° C. and 300° C., the surface unevenness on the upper surface 10a of the substrate 10 is 15 nm or less, which is about half of surface unevenness in a case of being incomplete, and that as a result, the number of pinholes in the resistor 30 is drastically reduced to about 1/7. Note, however, that in consideration of resistance to thermal temperature of a polyimide resin, when heat treatment is carried out at temperatures exceeding 250° C., alteration or deterioration may occur. Accordingly, it is preferable that the heat treatment be carried out at temperatures between 100° C. and 250° C. Note that it is considered that the surface unevenness is reduced by heat treatment because fillers are contained in a polyimide resin that constitutes the substrate 10, during thermal shrinkage caused by the heat treatment.

According to consideration by the inventors, the number of pinholes (about 140) in the case of Incomplete, as illustrated in FIG. 15, indicates a level of the gauge characteristics deteriorating. In contrast, the number of pinholes (about 20) after heat treatment, indicates a level of the gauge characteristics not being adversely affected. In other words, when the resistor 30 having a film thickness of 0.05 μm is used, in a case where the surface unevenness on the upper surface 10a of the substrate 10 is 15 nm or less, it was confirmed that the number of pinholes that were generated in the resistor 30 could be reduced to indicate a level of the gauge characteristics not being adversely affected.

Note that when the resistor 30 having a film thickness of greater than 0.05 μm is used, it is obvious that when the surface unevenness on the upper surface 10a of the substrate 10 is 15 nm or less, the number of pinholes that are generated in the resistor 30 can be reduced to indicate a level of the gauge characteristics not being adversely affected. In other words, with the surface unevenness on the upper surface 10a of the substrate 10 being 15 nm or less, when the resistor 30 having a film thickness of 0.05 μm or more is used, the number of pinholes that are generated in the resistor 30 can be reduced to indicate a level of the gauge characteristics not being adversely affected.

As described above, with the substrate 10 being subject to heat treatment, the surface unevenness on the upper surface 10a of the substrate 10 can be 15 nm or less, and as a result, the number of pinholes that are generated in the resistor 30 having a film thickness of 0.05 μm or more can be significantly reduced. As a result, the strain gauge 1 can function stably in a manner such that good gauge characteristics are maintained.

Note that in order to reduce the number of pinholes that are generated in the resistor 30, it is important to reduce the surface unevenness on the upper surface 10a of the substrate 10, and a method of reducing surface unevenness is not important. In the above description, the method of reducing surface unevenness by heat treatment has been described, but is not limited to this case. Any method may be used as long as the surface unevenness on the upper surface 10a of the substrate 10 can be reduced.

The surface unevenness on the upper surface 10a of the substrate 10 can be reduced by, for example, a method of scraping a protrusion by approximately vertically irradiating the upper surface 10a of the substrate 10, with laser light; a method of cutting a protrusion by moving a water cutter or the like to be parallel to the upper surface 10a of the substrate 10; a method of polishing the upper surface 10a of the substrate 10 with a grinding wheel; a method of pressing the substrate 10 while heating (heat press); or the like.

Further, in order to reduce the number of pinholes that are generated in the resistor 30, it is important to reduce the surface unevenness on the upper surface 10a of the substrate 10, and is not necessarily limited to being directed to surface unevenness caused by the fillers that are present. It is effective to reduce surface unevenness not being caused by the fillers that are present, by various methods described above. For example, when surface unevenness on the substrate 10 without containing fillers is greater than 15 nm, in a case where the surface unevenness on the upper surface 10a of the substrate 10 is 15 nm or less, by various methods described above, the number of pinholes that are generated in the resistor 30 having a film thickness of 0.05 μm or more can be reduced to a level of the gauge characteristics not being adversely affected.

Example 4

In Example 4, the process illustrated in FIGS. 7A to 8D was modified as described in the modification 1 of the second embodiment, the strain gauge 2A with the electrodes 40B was fabricated, and the presence or absence of dissolution of metallization was checked. Specifically, 10 types of samples in each of which Cu was used for the metallic layers 42 and 43, in each of which NiP was used for the metallic layer 45, in each of which Au was used for the metallic layer 44, and in each of which the thickness of a given metallic layer was changed were fabricated (samples No. 1 to No. 10), and then the presence or absence of dissolution of metallization was checked.

Table 1 shows results. Note that in Table 1, the film thickness "0" indicates that no metallic layer was formed. The "poor" indicates that dissolution of metallization occurred in soldering being first performed. The "good" indicates that although no dissolution of metallization occurred in soldering being first performed, little dissolution of metallization occurred in soldering being performed second (where soldering refinement, etc. was assumed). Additionally, the "excellent" indicates that dissolution of metallization occurred neither in soldering being performed first nor second.

TABLE 1

| SAMPLE No. | EACH FILM THICKNESS [μm] | | | SOLDERABILITY |
|---|---|---|---|---|
| | Cu | NiP | Au | |
| 1 | 0.5 | 0 | 0 | POOR PRESENCE OF DISSOLUTION OF METALLIZATION |
| 2 | 0.5 | 0 | 0.1 | POOR PRESENCE OF DISSOLUTION OF METALLIZATION |
| 3 | 0.5 | 0 | 0.8 | POOR PRESENCE OF DISSOLUTION OF METALLIZATION |
| 4 | 1 | 1 | 0.1 | GOOD ABSENCE OF DISSOLUTION OF METALLIZATION |
| 5 | 3 | 0 | 0 | EXCELLENT ABSENCE OF DISSOLUTION OF METALLIZATION |
| 6 | 3 | 0 | 0.1 | EXCELLENT ABSENCE OF DISSOLUTION OF METALLIZATION |
| 7 | 3 | 0 | 0.8 | EXCELLENT ABSENCE OF DISSOLUTION OF METALLIZATION |
| 8 | 3 | 1 | 0.1 | EXCELLENT ABSENCE OF DISSOLUTION OF METALLIZATION |
| 9 | 5 | 1 | 0.1 | EXCELLENT ABSENCE OF DISSOLUTION OF METALLIZATION |
| 10 | 8 | 1 | 0.1 | EXCELLENT ABSENCE OF DISSOLUTION OF METALLIZATION |

As shown in Table 1, it was confirmed that when the thickness of Cu was 1 μm or more, dissolution of metallization was improved, and that when the thickness was 3 μm or more, the dissolution of metallization was further improved. Additionally, from the results for sample 1 and sample 5, it was confirmed that the presence or absence of dissolution of metallization was determined only according to the thickness of Cu and was not determined upon the presence or absence of each of NiP and Au. Note, however, that as described above, in order to prevent dissolution of metallization and improve solder wettability, a metallic layer formed of Au or an equivalent material (Pt, etc.) is required.

The preferred embodiments and the like have been described above in detail, but are not limited thereto. Various modifications and alternatives to the above embodiments and the like can be made without departing from a scope set forth in the claims.

This International application claims priority to Japanese Patent Application Nos. 2017-191824, filed Sep. 29, 2017, and 2018-052422, filed Mar. 20, 2018, the contents of which are incorporated herein by reference in their entirety.

REFERENCE SIGNS LIST 1, 1A, 2, 2A, 2B strain gauge, 5 sensor module, 10 substrate, 10a upper surface, 20 functional layer, 30 resistor, 41 terminal section, 40A, 40B, 40C electrode, 42, 43, 44, 44A, 45, 45A metallic layer, 50 insulating layer, 60 cover layer, 110 flexure element, 120 adhesive layer

The invention claimed is:
1. A strain gauge comprising:
a flexible resin substrate;
a functional layer formed of a metal, an alloy, or a metal compound, directly on one surface of the substrate;
a resistor formed of a film including Cr, CrN, and $Cr_2N$, on one surface of the functional layer; and
an insulating resin layer with which the resistor is coated, wherein the substrate has an expansion coefficient in a range of from 7 ppm/K to 20 ppm/K.
2. The strain gauge according to claim 1, wherein the functional layer includes a function of promoting crystal growth of the resistor.

3. The strain gauge according to claim 1, wherein surface unevenness on the one surface of the substrate is 15 nm or less, and
wherein the resistor has a film thickness of 0.05 µm or more.

4. The strain gauge according to claim 1, further comprising electrodes electrically coupled to the resistor,
wherein each electrode includes:
a terminal section extending from a corresponding end portion from among end portions of the resistor;
a first metallic layer formed of copper, a copper alloy, nickel, or a nickel alloy, on or above the terminal section; and
a second metallic layer formed of material having better solder wettability than the first metallic layer, on or above the first metallic layer.

5. The strain gauge according to claim 1, further comprising an insulating layer formed of material having higher resistance than the resistor and the insulating resin layer, the insulating layer being provided in a lower layer of the insulating resin layer, and the resistor is being coated with the insulating layer.

6. The strain gauge according to claim 1, wherein a main component of the resistor is alpha-chromium.

7. The strain gauge according to claim 6, wherein the resistor includes alpha-chromium of 80% by weight or more.

8. The strain gauge according to claim 6, wherein the functional layer includes titanium.

9. The strain gauge according to claim 8, wherein the resistor includes titanium.

10. The strain gauge according to claim 8, wherein the resistor includes titanium nitride.

11. A sensor module comprising:
the strain gauge according to claim 1; and
a flexure element disposed on another surface of the substrate.

12. A strain gauge comprising:
a flexible resin substrate;
a functional layer formed of a metal, an alloy, or a metal compound, directly on one surface of the substrate;
a resistor formed of a film that includes Cr, CrN, and $Cr_2N$ and into which an element included in the functional layer is diffused, on one surface of the functional layer; and
an insulating resin layer with which the resistor is coated,
wherein a gauge factor of the strain gauge is 10 or more, and
wherein the substrate has an expansion coefficient in a range of from 7 ppm/K to 20 ppm/K.

13. A strain gauge comprising:
a flexible resin substrate;
a functional layer formed of a metal, an alloy, or a metal compound, directly on one surface of the substrate;
a resistor formed of a film that includes Cr, CrN, and $Cr_2N$ and into which an element included in the functional layer is diffused, on one surface of the functional layer; and
an insulating resin layer with which the resistor is coated,
wherein a temperature coefficient of resistance of the strain gauge is in a range of from −1000 ppm/° C. to +1000 ppm/° C., and
wherein the substrate has an expansion coefficient in a range of from 7 ppm/K to 20 ppm/K.

* * * * *